United States Patent
McGrew

(10) Patent No.: US 10,321,105 B2
(45) Date of Patent: Jun. 11, 2019

(54) IMAGE AND WAVE FIELD PROJECTION THROUGH DIFFUSIVE MEDIA

(71) Applicant: Vuzix Corporation, West Henrietta, NY (US)

(72) Inventor: Stephen P. McGrew, Spokane, WA (US)

(73) Assignee: Vuzix Corporation, West Henrietta, NY (US)

( * ) Notice: Subject to any disclaimer, the term of this patent is extended or adjusted under 35 U.S.C. 154(b) by 799 days.

(21) Appl. No.: 14/814,443

(22) Filed: Jul. 30, 2015

(65) Prior Publication Data

US 2016/0037146 A1 Feb. 4, 2016

Related U.S. Application Data

(60) Provisional application No. 62/031,702, filed on Jul. 31, 2014.

(51) Int. Cl.
| | |
|---|---|
| *G03H 1/04* | (2006.01) |
| *G03H 1/28* | (2006.01) |
| *G02B 27/01* | (2006.01) |
| *H04N 9/31* | (2006.01) |

(52) U.S. Cl.
CPC ....... H04N 9/3185 (2013.01); G02B 27/0103 (2013.01); G02B 27/0172 (2013.01); G03H 1/28 (2013.01); *G02B 2027/013* (2013.01); *G02B 2027/0174* (2013.01); *G02B 2027/0178* (2013.01); *G03H 2001/0434* (2013.01); *G03H 2001/0439* (2013.01)

(58) Field of Classification Search
CPC .............................. G02B 5/32; G02B 27/017
USPC .............. 359/1, 9, 10, 11, 13, 22, 28, 32, 33
See application file for complete search history.

(56) References Cited

U.S. PATENT DOCUMENTS

| | | | |
|---|---|---|---|
| 6,175,431 B1 | 1/2001 | Waldern et al. | |
| 7,352,469 B2 | 4/2008 | McGrew | |
| 8,472,120 B2 * | 6/2013 | Border ............... | G02B 27/0093 353/28 |

(Continued)

FOREIGN PATENT DOCUMENTS

| | | |
|---|---|---|
| CN | 1263671 A | 8/2000 |
| CN | 101539515 A | 9/2009 |

(Continued)

OTHER PUBLICATIONS

International Search Report and Written Opinion in Application No. PCT/US2015/043024, dated Dec. 7, 2015, 11 pages.

(Continued)

*Primary Examiner* — Robert E. Tallman
(74) *Attorney, Agent, or Firm* — Thomas B. Ryan; Harter Secrest & Emery LLP

(57) ABSTRACT

Methods and systems for projecting wave fields use a diffusing medium, a wavefront shaper, an illumination source, and a control system. A system for projecting an object wave field into a projection volume includes a wave scatterer, a wave field projector configured to project a wave field onto the wave scatterer, and a controller coupled to the wave field projector. The controller is configured to cause the wave field projector to project a wave field that, upon interacting with the wave scatterer, is redirected to form an object wave field that forms a predetermined pattern in the projection volume.

18 Claims, 23 Drawing Sheets

(56) References Cited

U.S. PATENT DOCUMENTS

| | | |
|---|---|---|
| 2005/0286126 A1 | 12/2005 | Huang et al. |
| 2008/0186547 A1 | 8/2008 | Shimizu et al. |
| 2011/0032587 A1 | 2/2011 | Bjelkhagen et al. |
| 2013/0222384 A1 | 8/2013 | Futterer |
| 2014/0063077 A1 | 3/2014 | Wetzstein et al. |
| 2014/0185015 A1 | 7/2014 | Chen et al. |

FOREIGN PATENT DOCUMENTS

| | | |
|---|---|---|
| JP | 2005017894 A | 1/2005 |
| WO | 9904576 A1 | 1/1999 |

OTHER PUBLICATIONS

Chaigne et al., "Controlling light in scattering media non-invasively using the photoacoustic transmission matrix," Nature Photonics 8, 58-64 (2014).
Fellner et al., "Toward the Light Field Display: Autostereoscopic Rendering via a Cluster of Projectors," EUROGRAHICS 2006, 5 pages.
I. M. Vellekoop et al., "Focusing coherent light through opaque strongly scattering media," Optics Letters, vol. 32, No. 16., Aug. 15, 2007, pp. 2309-2311.
I. M. Vellekoop et al., "Exploiting disorder for perfect focusing" (ArXiv:0910.0873v1 [Physics.optics] Oct. 5, 2009).
Van Putten, et al., "Scattering Lens Resolves Sub-100 nm Structures with Visible Light," Physical Review Letters, PRL 106, 193905 (May 2011).
Extended European Search Report in European Application No. 15827770.7, dated Mar. 12, 2018, 7 pages.
Chinese Office Action (with English translation) for Application No. 201580050263.6 dated Jul. 18, 2018.

\* cited by examiner

IMAGE AND WAVE FIELD PROJECTION THROUGH DIFFUSIVE MEDIA

CROSS-REFERENCE TO RELATED APPLICATION

This application claims the benefit of U.S. Provisional Patent Application No. 62/031,702, filed Jul. 31, 2014, which is incorporated herein by reference in its entirety.

TECHNICAL FIELD

The present technology is directed to projection of wave fields through diffusive media, and more particularly to methods and systems for projecting images through non-conventional scattering elements.

BACKGROUND

A host of methods have been described in the scientific literature and the patent literature, for imaging through diffusing media. However, there remains a need to accomplish just the opposite: to project images or other wave fields into a space that is obscured from the projector by a diffusing medium.

Recent work in microscopy has shown that it is possible to pre-distort an optical wavefront in such a way that a diffuser restructures the wavefront to form a converging spherical wavefront that focuses to a point. For example, I. M. Vallekoop et. al., in "Exploiting disorder for perfect focusing" (ArXiv:0910.0873v1 [Physics.optics] 5 Oct. 2009), which is hereby incorporated by reference in its entirety, describe using a spatial light modulator to pre-distort a wavefront and, via a learning algorithm, transmit the wavefront through a very strong diffuser, to a finely focused spot.

A substantial amount of work has been done to employ arrays of projectors to form so-called "light field displays", which essentially reverse the process of lenticular photography. For example, Fellner and Hansen in EUROGRAPHICS 2006 presented a paper, "Toward the Light Field Display: Autostereoscopic Rendering via a Cluster of Projectors", which is hereby incorporated by reference in its entirety. In the paper, the authors describe projecting imagery from an array of projectors onto the diffusing surface of a screen comprising a lenslet array and a diffusing surface separated by the focal length of the lenslets. The diffusing screen serves as an image relay to the back focal planes of the lenslets which then project a light field in the form of an array of pinhole projections.

In US Patent Application US 2014/0063077, "Tensor Displays", by Wetzstein et al., which is hereby incorporated by reference in its entirety, a 3D display is described that involves a stack of spatially-addressable light attenuating layers. Wetzstein et al also described a "Compressive Light Field Projector" that employs a highly structured lenticular screen and a spatial light modulator. The present technology employs one or more spatial phase modulators and one or more non-conventional optical elements as described herein.

Figure 1:
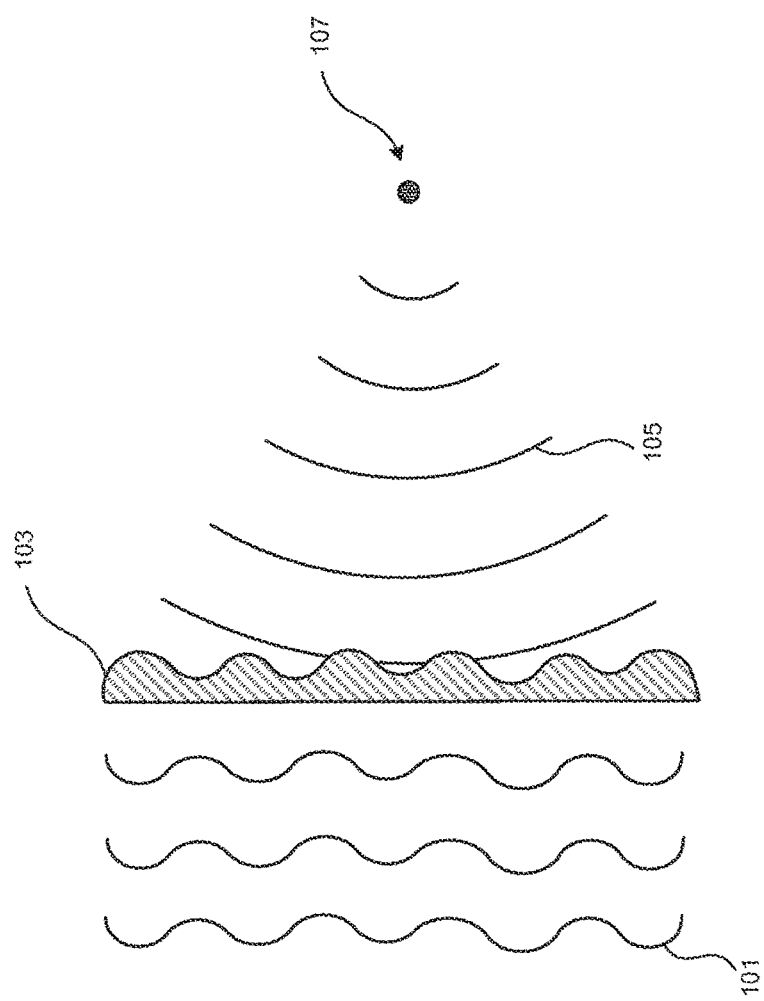
FIG. 1 illustrates a pre-distorted wave field entering a diffuser, then being re-shaped by the diffuser to converge to a point focus.

The headings provided herein are for convenience only and do not necessarily affect the scope or meaning of the claimed invention. Sizes of various depicted elements are not necessarily drawn to scale and these various elements may be arbitrarily enlarged to improve legibility.

DETAILED DESCRIPTION

Introduction

The linear nature of light propagation allows a direct method for recovering an image from light emitted by an object and then diffused in transmission through a diffusing medium. In essence, the diffused or scattered pattern resulting from light emitted by a single object point can be interpreted as an encoded version of the light from that object point. The diffused or scattered pattern resulting from light emitted by multiple object points is, in the case of incoherent illumination, simply the linear superposition of the encoded versions of all the individual object points.

Although well-known matrix algebra methods can be used to decode a composite diffused or scattered pattern if the individual component patterns are known, in practice it is much more efficient to use successive approximations to do the decoding. However, the important point is not the mathematical technique used to decode the composite pattern. Instead, the important point is twofold: first, decoding is possible; and second, linearity of the problem implies that the process can be inverted.

Embodiments of the current technology, which is based on a realization that the decoding process can be inverted, form an encoded light field that, upon transmission through a diffusing medium, is decoded to form a desired light field which forms a complex image. In some embodiments, the complex image can focus on a two-dimensional or three-dimensional surface of arbitrary shape. Similarly, the complex image can comprise a real three-dimensional image in free space.

As used herein, a "conventional scattering element" (CSE) is an element whose function is to add an effectively linear or effectively quadratic phase function (or a close approximation thereto) to the phase of an incident wave field. Adding a linear phase function changes the direction of rays in the wave field uniformly across the optical element, so for example a mirror comprises a single linear phase function CSE, while a prism comprises a pair of linear phase function CSEs (one at the entrance surface and one at the exit surface). Adding a quadratic phase function changes the direction of rays in the wave field in a way that varies across the optical element. A parabolic mirror is a radially symmetric quadratic CsE, and an ordinary lens is a pair of radially symmetric quadratic CsEs (i.e., the front and back surfaces of the lens). Similarly, simple diffraction gratings qualify as linear CsEs, and Fresnel zone plates qualify as quadratic CsEs.

As used herein, a "non-conventional scattering element" (NOSE) is any optical element that transforms an incident wave field in a substantially more complex way than does a CSE. Some examples of static NCSEs include: complex holograms, random ground-glass diffusers, shower glass, diffuse reflectors, lenslet arrays, retroreflective bead arrays, and transmissive elements made from scattering media. Some examples of programmable NCSEs include: micromirror arrays, liquid crystal spatial light modulators, and deformable mirrors.

An example non-conventional scattering element that may be incorporated in some embodiments of the present technology is a complex holographic element. A complex holographic element is any optical element that, via diffraction, applies a substantially more complicated transformation to a light field than is applied by a CSE. In some embodiments, a diffuser may be used as an NOSE, to transform a first class of incident wave fields to a second class of wave fields. For example, a wave field appropriately matched to a specific diffuser is transformed by that diffuser to a wave field that focuses to a point.

Further examples of the invention will now be described. The following description provides certain specific details for a thorough understanding and enabling description of these examples. One skilled in the relevant technology will understand, however, that the invention may be practiced without many of these details. Likewise, one skilled in the relevant technology will also understand that the invention may include many other obvious features not described in detail herein. Additionally, some well-known structures or functions may not be shown or described in detail below, to avoid unnecessarily obscuring the relevant descriptions of the various examples.

The terminology used herein is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section. In general, brief definitions of several terms used herein are preceded by the term being enclosed within double quotation marks. Such definitions, although brief, will help those skilled in the relevant art to more fully appreciate aspects of the invention based on the detailed description provided herein. Such definitions are further defined by the description of the invention as a whole (including the claims) and not necessarily just by such definitions.

Wave Field Projection Through Diffusing Media

FIG. 1 illustrates a predistorted wave field 101 entering a diffuser 103, then being re-shaped by the diffuser 103 into a second wave field 105 which converges to a point 107. This illustrates the projection to a single point in a projection volume. This approach can be extrapolated to generate more complex images. A linear superposition of other wave fields configured to illuminate other points in the projection volume can be provided simultaneously to generate a complex image comprising many points (voxels) in the projection volume.

The contrast of a focused point formed in a light field through a diffuser is proportional to N/M, where N is the number of degrees of freedom in the light field, and M is the number of points being focused to. This implies that the image will degrade as the number of points in the image is increased; and that the only way to obtain a high-content image would be to have an extremely large number of degrees of freedom. However, an image displayed as a raster scan or line scan, or in general as a rapid succession of different portions of the image, will not suffer the same contrast loss as a complete image displayed as a whole. Instead, such an image will have contrast proportional to N/R, where R is the number of points in the image portion displayed at each moment in the scan.

There are several possible ways to take advantage of that principle in order to obtain a higher-contrast image of a high-content object when projecting through a diffuser. One such way, "sub-frame projection," is to rapidly project many sub-frame light fields sequentially, each of which comprises a portion of the image to be projected. For example, the sub-frame light fields can comprise columns or lines of pixels in the image. Alternatively, the sub-frame light fields may comprise image segments, with the image segmented into regions in which contrast or resolution has different levels of visual importance, such as human faces versus background, or important alphanumeric updates versus ongoing image content. In another example, the image may be segmented according to regions of viewer attention.

Figure 2:
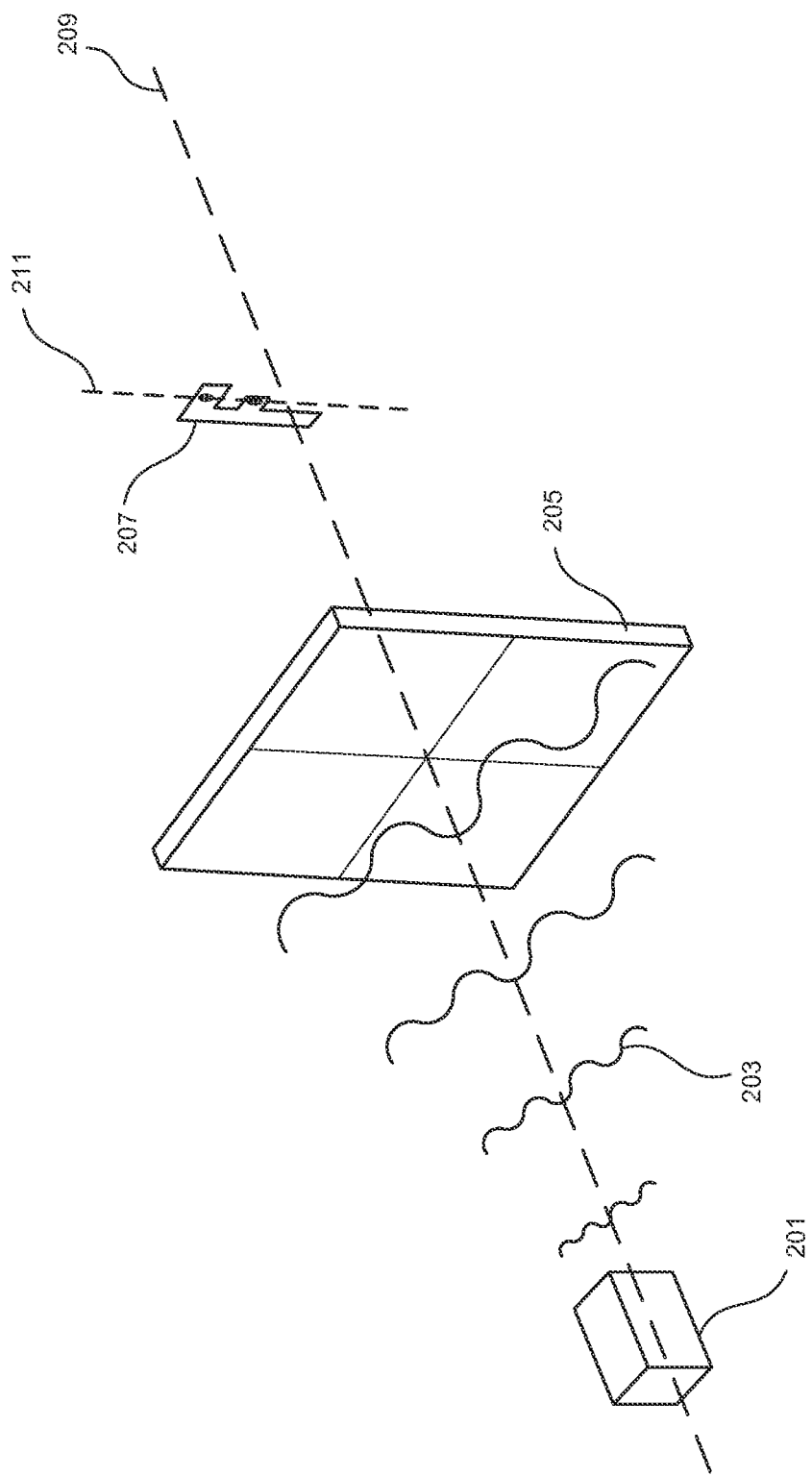
FIG. 2 illustrates a wave field projector emitting a pre-distorted wave field which enters a diffuser and then forms a column of image points after re-shaping by the diffuser.

FIG. 2 illustrates a wave field projector 201 emitting a predistorted wave field 203 which enters a diffuser 205 then forms an image 207 after re-shaping by the diffuser 205. The wave field 203 propagates approximately along the direction of optical axis 209. Light passing through the diffuser 205 illuminates a plurality of voxels in the projection volume to generate one column 211 of voxels in the image 207, here having the shape of the letter "F". I refer to this method of projection, in which only a relatively small fraction of the total number of voxels in an image are projected at any instant, as "sub-frame projection". The entire image 207 is generated by sequentially generating each of the columns of voxels comprising image 207.

One way to optimize the visual quality of an image projected according to the present technology is a combination of a) providing a large number of degrees of freedom in the light field projector (such as using multiple spatial light modulators or OLED arrays), b) designing and constructing the diffuser to direct light preferentially to the pixel array that will be displayed, c) further designing and constructing the diffuser to direct light only to an eyebox in which a viewer's eyes will be, and d) matching the light field projector controller's degrees of freedom with the diffuser so that a set of control states corresponds to a set of light field configurations which in turn correspond to predetermined columns or rows of pixels in the displayed image.

When sub-frame projection is used, a light field projector that can switch configurations much faster than the standard video projection frame rate can be used. Most liquid crystal devices are not fast enough to do this. However, MEMS devices such as micromirror projectors can switch on a microsecond timescale. The preferred light field projector has very short switching time so that it can rapidly project sub-frame image components.

Figure 3:
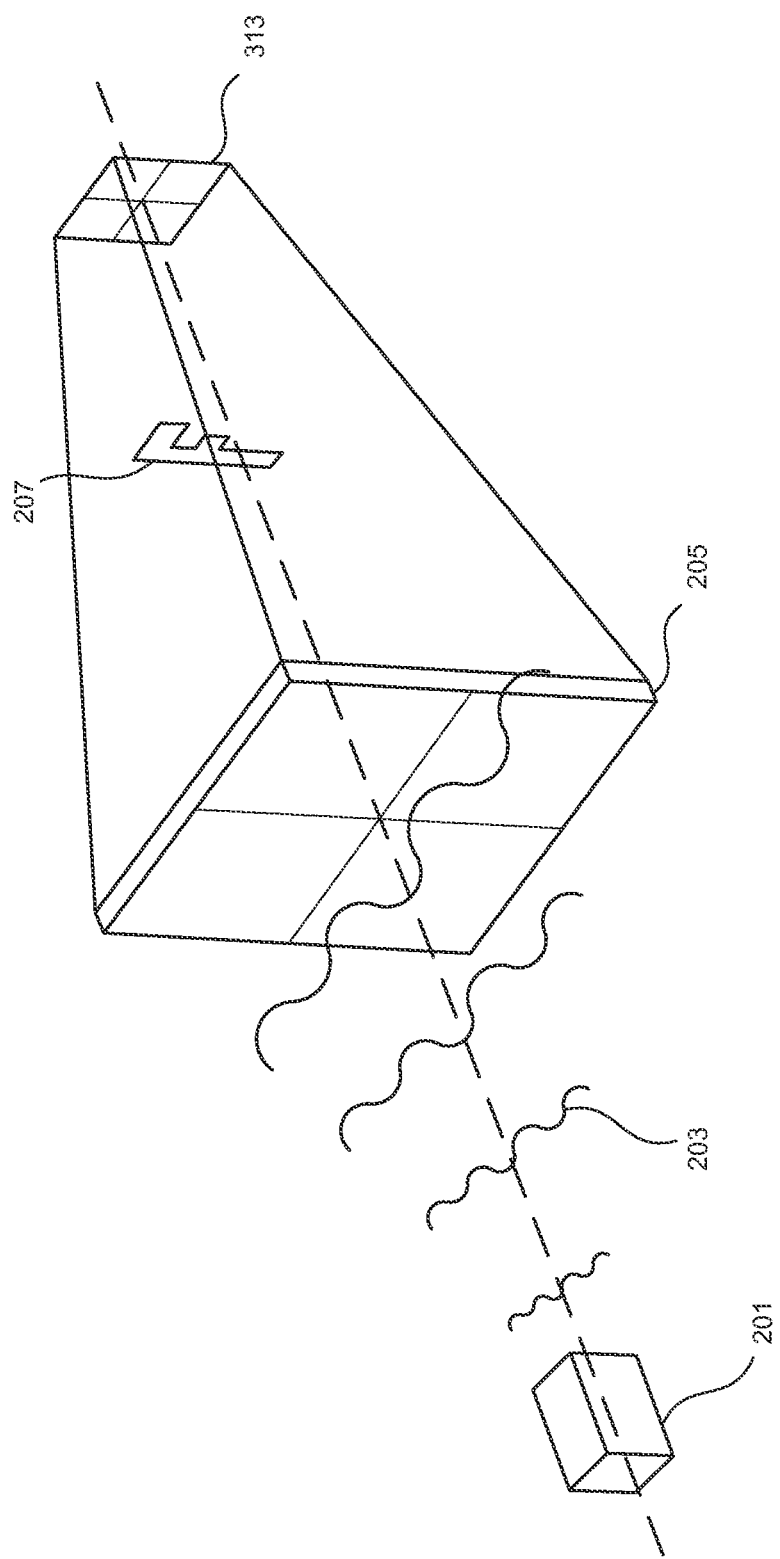
FIG. 3 illustrates an image visible through an eyebox in a light field formed by transmission of a wavefront through a diffuser

FIG. 3 illustrates an image visible through an eyebox 313 in a light field formed by transmission of a wavefront 203 through a diffuser 205. The components are similar to that of FIG. 2 except that the eyebox 313 is added to represent the intended viewing area from which a viewer would see the image 207.

Figure 4:
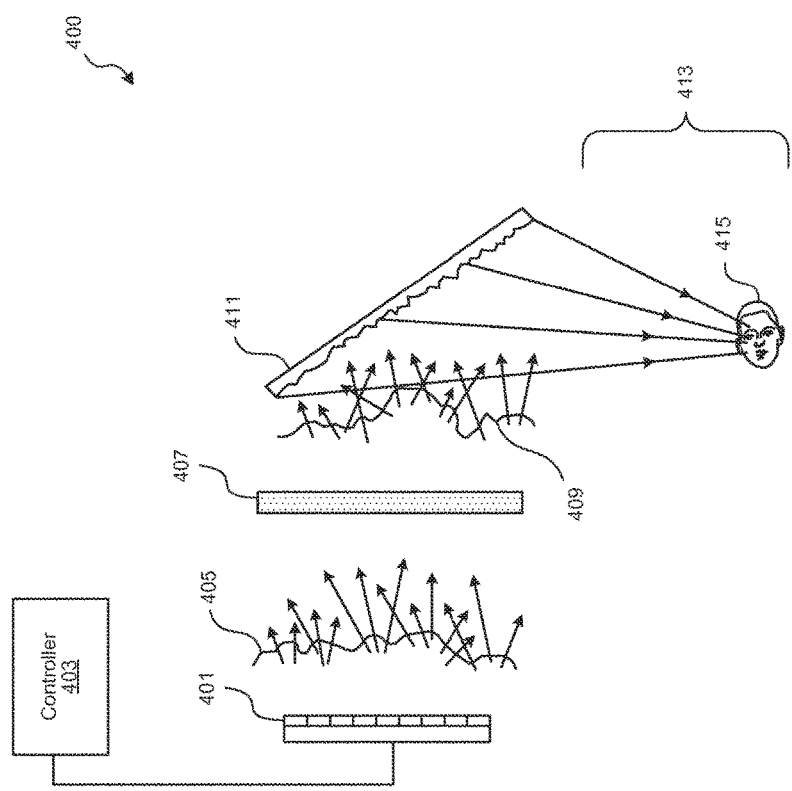
FIG. 4 illustrates a projection system comprising a wave field emitter and two diffusers, together forming an image in a projection volume

FIG. 4 illustrates a system 400 including a wave field generator 401 coupled to a controller 403. A first wave field 405 is emitted from the wave field generator 401 towards a first diffuser 407, which is a transmissive diffuser. Via interaction between the first wave field 405 and the first diffuser 407, a second wave field 409 is emitted from the first diffuser 407 towards a second diffuser 411, which is a reflective diffuser. Light reflected from the second diffuser 411 is focused into the projection volume 413 to generate an image visible to an observer 415.

The wave field generator 401 can have any of several different forms such as an array of conventional projectors, or multiple wavefront-shaping transducers illuminated by coherent or incoherent waves. The terms, "wave field generator" and "wave front shaper" are interchangeable, because a wave front shaper can form an arbitrary wave field by being illuminated by an initial wave field such as a collimated monochromatic laser beam and reshaping the initial wave field as needed. The first and second diffusers 407 and 411 can have any of several different forms, such as ground-glass diffusers, "shower glass" diffusers, bumpy reflective surfaces, corrugated glass, or media with nonuniform refractive index or propagation speed. In some embodiments, the diffusing properties of the diffusers can be random. The diffusers may be transmissive, reflective, or both. Scattering within each diffuser may be single or multiple. The diffusers can have any shape such as flat or curved.

In order to generate the desired image, the wave field generator 401 can be calibrated to accommodate the characteristics of the first and second diffusers 407 and 411. Although some methods of associating light fields at the input end of a complex optical system with light fields at the output end of the optical system—that is, methods for calibrating the optical system—are known, that association has only been used in prior approaches for seeing through the optical system, as in microscopy, photography through turbid media, astronomy, and long-distance photography. In contrast, embodiments of the current technology can accomplish the opposite result: to project an image through a diffusive or scattering optical system. This can be accomplished by calculating an input light field required to form a desired output light field after passing through a given complex, scattering, or diffusive optical system. For example, a desired object light field may be represented as a linear sum of plane waves, and the light field that must be projected into the diffusing medium to form the desired object light field will be a linear sum of the corresponding component light fields.

Figure 5:
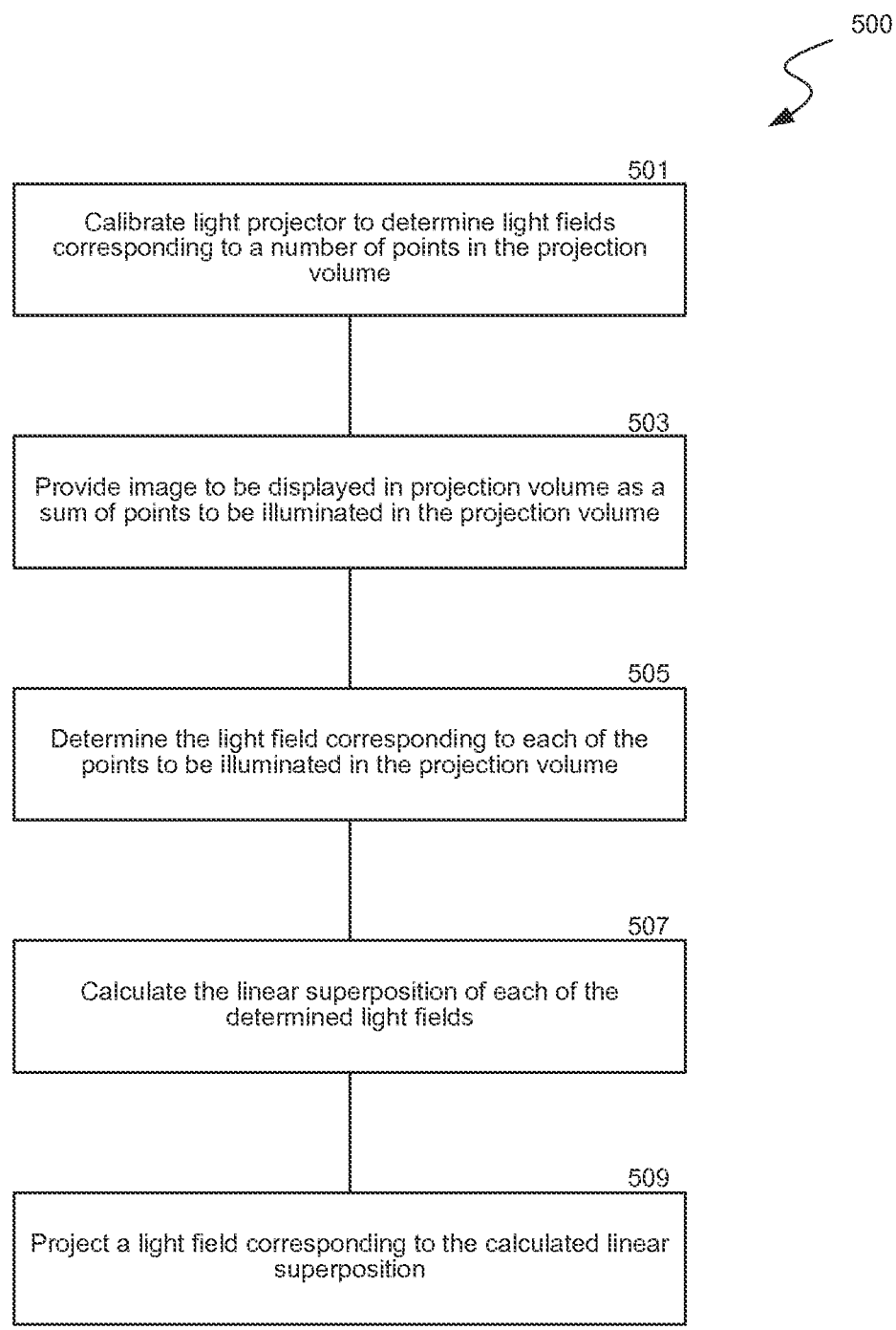
FIG. 5 is a flow-diagram illustrating steps in using an embodiment of the present technology.

FIG. 5 illustrates an example process 500 for projecting an image through a diffusive medium and into a projection volume. The process begins in block 501 with calibrating the light projector to determine light fields corresponding to a number of points in the projection volume. As noted above, this calibration may be accomplished using a number of different approaches. The process continues in block 503 with providing an image to be displayed in the projection volume as a sum of points to be illuminated in the projection volume. The process continues in block 505 with determining the light field corresponding to each of the points to be illuminated in the projection volume. For example, if a static image to displayed in the projection volume consists of 1000 points to be illuminated, then the corresponding light field can be calculated for each of those 1000 points. Next, in block 507, the linear superposition of the determined light fields is calculated. Using the example above, the process would involve calculating the linear superposition of the 1000 light fields that correspond to illumination of the 1000 identified points in the projection volume. Next, in block 509, a light field is projected that corresponds to the calculated linear superposition. As a result, each of the indicated points in the projection volume will be illuminated, producing the desired image in the projection volume. The image may be three-dimensional or two-dimensional, and may be static or dynamic (e.g., video).

Figure 6A:
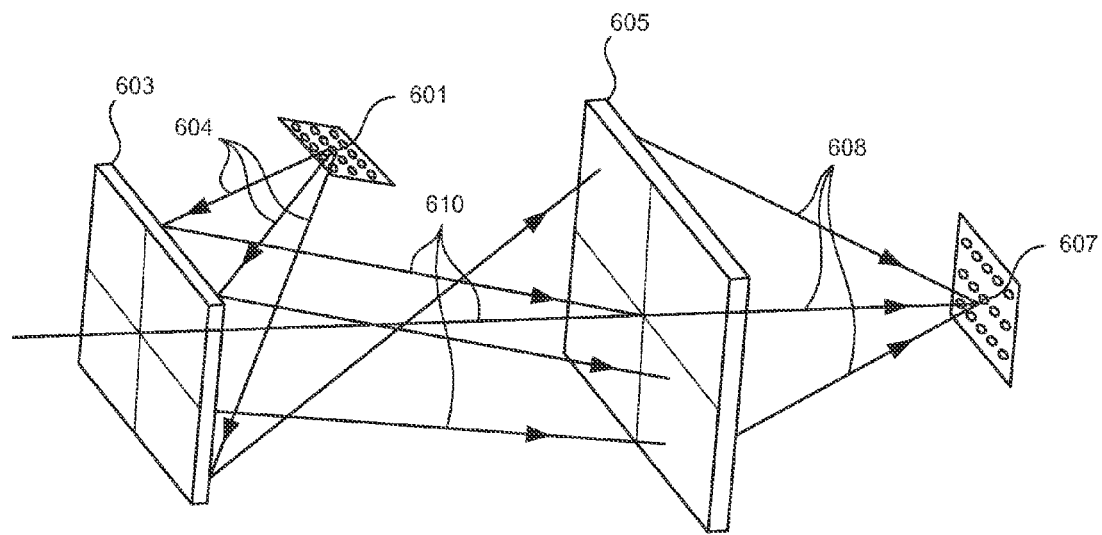
FIG. 6A illustrates a projection system comprising an array of point light sources, a first volume holographic diffuser, a second diffuser, and an array of points in a projection volume.
Figure 6B:
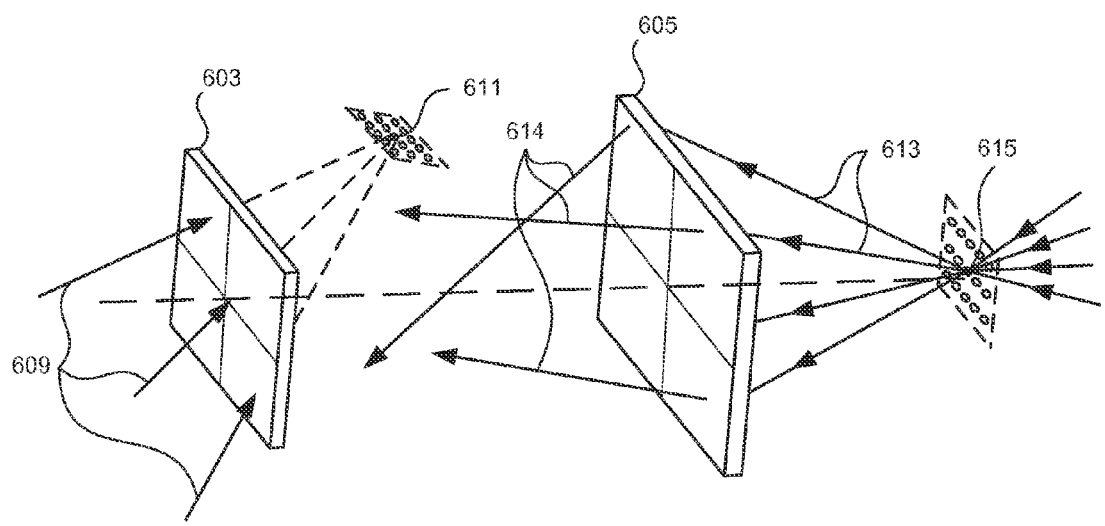
FIG. 6B illustrates a method for creating one component of the holographic diffuser in 6A.

FIGS. 6A and 6B illustrate a projection system in which a holographic diffuser is constructed to provide the desired optical characteristics for projection of images. FIG. 6A illustrates a projection system according to the present technology, comprising an array of point light sources 601, a first volume holographic diffuser 603, a second diffuser 605, and an array of points in a projection volume 607. As illustrated, light 604 from the point light source 601 is reflected and redirected by the holographic diffuser 603 as light 610 towards the second diffuser 605, which focuses the light 608 onto a particular point 607. FIG. 6B illustrates a method for creating one component of the holographic diffuser 603 in FIG. 6A. As shown in FIG. 6B, light 609 from a coherent laser source is directed towards a particular point 611 which corresponds to the position that a light source 601 will be positioned in the system of FIG. 6A. Simultaneously, light 613 is emitted from a point 615 which corresponds to the position of point 607 in the projection volume of FIG. 6A and is coherent with respect to light 609. Light emitted from point 615 is scattered via the transmissive diffuser 605 as light 614 and propagates towards the holographic diffuser 603. The interference between the light 613 from the point 615 and the reference beam 609 enables the construction of a particular component of the holographic diffuser 603; which component will, as in FIG. 6A, result in light from point source 601 being focused to projection space point 607. To construct the complete holographic diffuser 603, a separate exposure may be made for each pair of point positions 611 and 615. Note that no calibration is necessary for the system of FIG. 6A. Because, the holographic element 603 automatically shapes wavefront 610 to form the requisite image components 607.

Figure 8:
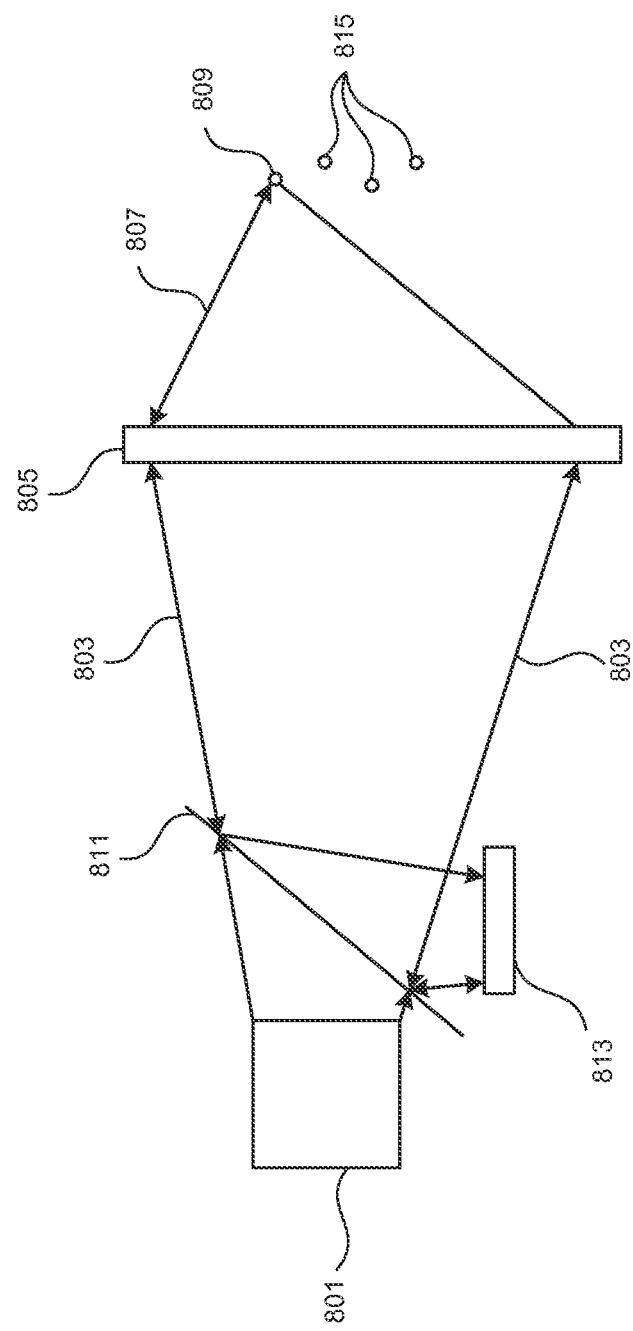
FIG. 8 illustrates a method for calibrating a diffuser used in a light field projector using one or more retroreflective beads.

In using the system illustrated in FIG. 4, a calibration step will typically be performed first. Various calibration techniques are possible and several will be described in detail below. One such calibration technique for a light wave field projector is to place multiple retroreflective particles in the region where an image is to be formed, as illustrated in FIG. 8. A random light field is projected through the diffusing media. Some of the light falls upon the retroreflective particles and returns to the light field projector. The light field is varied under control of an optimization algorithm, until a light field is found that directs a maximum amount of light onto a single retroreflective particle.

Various optimization approaches are possible, as will be understood by those of skill in the art. The methods that use a wavefront shaper can often find an optimum by simply varying one element of the wavefront shaper at a time, seeking maximum brightness of a return signal (e.g., from the retroreflective particle). An algorithm cycles through all the elements of the wavefront shaper multiple times, seeking an maximum return for each element, until no further improvement is found.

The methods that are purely mathematical typically start with a guess at the phase components of the scatter pattern, and represent the light field at the camera as "sqrt(brightness of scatter pattern)×exp(i×theta)" where theta is the phase (a function of x and y at the camera sensor array). The amplitude (sqrt(brightness of scatter pattern)), known from the camera image of the scatter pattern, is a first constraint. A mathematical transformation is done to move the representation to the Fourier domain, where other constraints are applied, such as requiring the autocorrelation of the scatter pattern to be a delta function. The further-constrained estimate of the scatter pattern light field is transformed back to the spatial domain where the amplitude constraint is applied again, and so on, cycling between spatial and Fourier domains and re-applying the constraints each time, until the quality of the solution is good enough. The quality of the solution corresponds to how well both sets of constraints are satisfied.

That optimum light field is an encoded version of an image point corresponding to the location of that single retroreflective particle. The process is repeated until an encoded version is found for each of the retroreflective particles. Note that this calibration process is very similar to the calibration process outlined in Ref. 1 Physical Review Letters 193905, May 2011, "Scattering lens resolves sub-100 nm structures with visible light". It is also analogous to the method used in Ref. 2 Optics Letters Vol. 32, No. 16, Aug. 15, 2007, "Focusing coherent light through opaque strongly scattering media". Each of these documents is hereby incorporated by reference in its entirety.

Figure 11A:
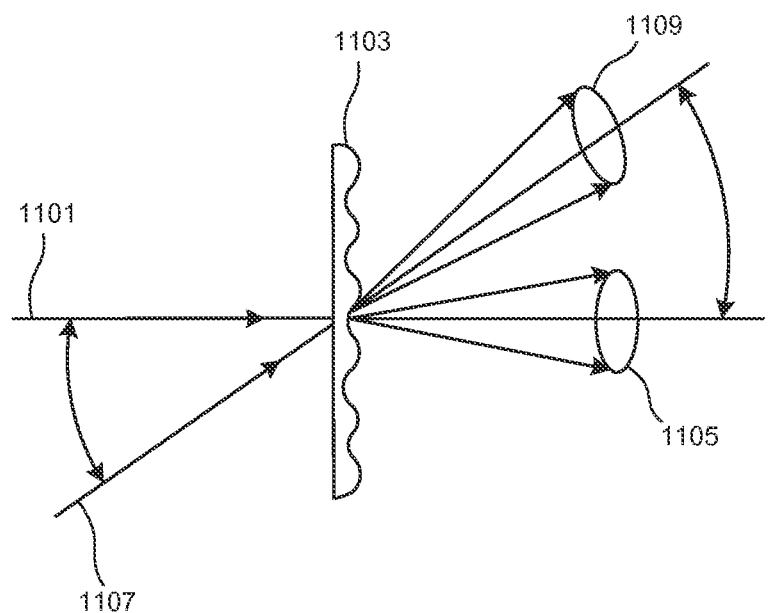
FIG. 11A illustrates the memory effect at a point in a diffuser
Figure 11B:
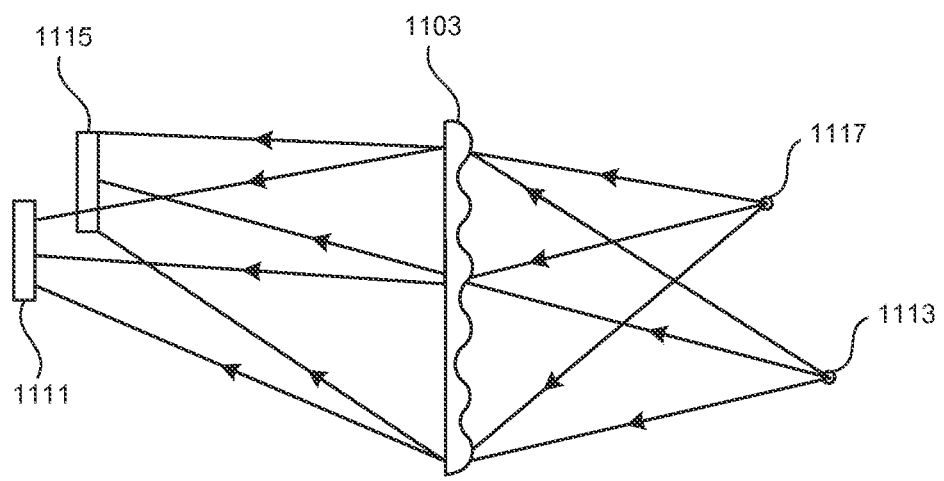
FIG. 11B illustrates the memory effect for an image formed by a light field propagating through a diffuser or through a hologram.

In order to project an image into the region beyond the diffusing media, the light field projector projects a linear superposition of the light fields corresponding to each of the points in the image. In practice, it may be impractical to place the retroreflective particles everywhere in the region where an image is to be formed; so upon first consideration it may seem that a detailed image cannot be formed. However, the so-called "memory effect" ensures that if the projected light field corresponding to a point is slightly tilted, the resulting focused point is still focused but is displaced in approximate proportion to the sine of the tilt angle. The memory effect is illustrated in FIGS. 11A and 11B. In FIG. 11A, light pattern 1109 is formed by ray 1107 incident on diffuser (or hologram) medium 1103. Tilting the angle of incidence of the ray 1107 (to form ray 1101) but keeping the position of incidence unchanged moves the light pattern 1109 to a new position 1105.

FIG. 11B illustrates an image 1115 formed by diffuser 1103 acting on light from source 1113 (which may be a point source or a more complicated wave field). Per the memory effect, moving source 1113 slightly to new position 1117 results in moving the image 1115 to new position 1111.

By modifying the curvature of the light field rather than applying only a simple uniform tilt, the focal point can be moved along the z-axis (that is, in the direction toward or away from the diffusing medium) This can be understood as follows. The light field which converges to a given point in the projection region necessarily comprises a spherical wave. To make the field converge to a new point farther from the diffusing medium, the spherical wave can be re-shaped to form a spherical wave centered on the new point. So, it is straightforward to calculate light fields that encode arbitrary points in a 3D region around a retroreflective particle. Therefore, it is not necessary to do calibration using retroreflective particles at every possible point in the image projection volume. If retroreflective particles are used in calibration, it is only necessary to use retroreflective particles positioned densely enough to ensure that the memory effect allows calculation of light fields corresponding to all points between the particles within the projection volume.

Although retroreflective particles provide one method for calibration described herein, it is also possible to calibrate in other ways, such as using a point light source at an array of positions in the projection volume. In this case, it can actually be simpler to discover input light fields corresponding to points in the projection volume because the light field formed at the light field generator by light transmitted in the reverse direction from a point in the projection volume through the diffusing media is the conjugate of the light field that will focus at that point after passing through the diffusing media in the forward direction. An alternative calibration method has been termed "transmission matrix measurement" (well described in Chaigne et al., "Controlling light in scattering media non-invasively using the photoacoustic transmission matrix", Nature Photonics 8, 58-64 (2014), which is hereby incorporated by reference in its entirety) and is fundamentally equivalent to the simpler case described above. If the transmission matrix of a complex, diffusive optical system is known, it is possible to extract the source object whose light has passed through the optical system and has been recorded at the other end of the optical system. To measure the transmission matrix, a plane wave can be projected into the diffusing media from the projection volume, and the resulting light field (or portions thereof) recorded on the projector side of the diffusing medium. The plane wave is projected into the diffusing media at many different angles, and the light field (or portion thereof) is recorded at each angle. Because an arbitrary object can be analyzed as a linear superposition of component plane waves, and because the transmission matrix comprises a linear transformation, the recorded light field from the object, after passing through the optical system, comprises a linear superposition of component light fields, each corresponding to a different plane wave component of the object.

Yet another alternative calibration method involves illuminating calibration patterns on a surface in the projection volume, with the patterns selected to amount to a basis set, so that any arbitrary pattern can be composed as a linear sum of the calibration patterns. Suitable sets of patterns include gratings of various pitch and angle, Gabor wavelets, and other such pattern sets well known in the art of image and signal processing. Several calibration methods are described in more detail below.

First Calibration Method

The first calibration method uses a known image (e.g., a point source of reflected light) propagated backward through the diffuser to a photosensor array and there combined with a reference beam to obtain an intensity distribution from which the phase and/or amplitude can be calculated at the location from which a light field will be projected toward the diffuser.

Figure 7A:
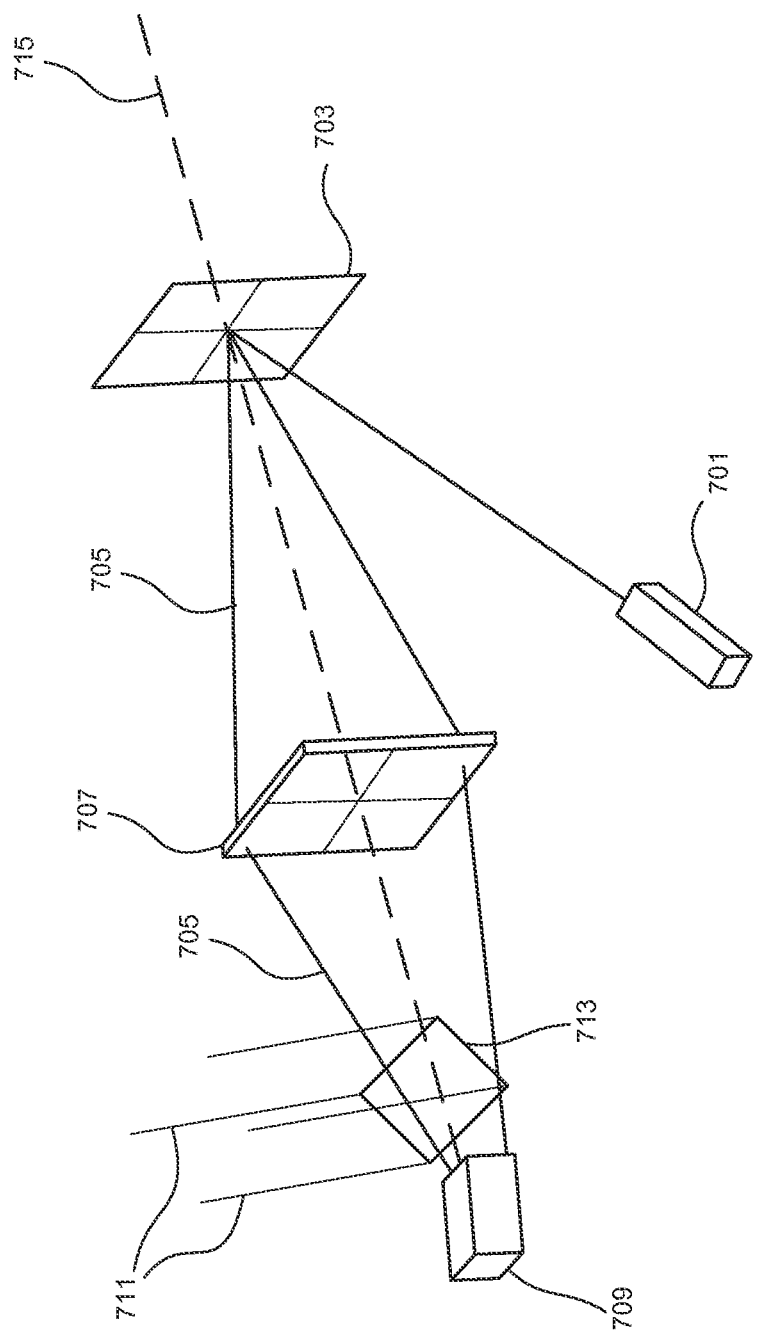
FIG. 7A illustrates a method for calibrating a light field projector to form a series of focal points in a projection volume.

FIG. 7A illustrates a method for calibrating a diffuser used in a light field projector in accordance with the first calibration method. Laser 701 illuminates a point on scattering screen 703. Scattered light 705 from the screen passes through diffuser 707 to camera 709. Light 711 from the same laser 701 enters the camera via beamsplitter 713. The camera 709 detects interference between light 705 and light 711, from which the phase of light 705 is inferred. By scanning the laser 701 to different points on the scattering screen 703, and by moving the screen 703 to different positions along axis 715, calibration can be performed for the entire projection volume.

A light field projector comprising a phase-only spatial light modulator, amplitude spatial light modulator, or combined phase and amplitude spatial light modulator positioned precisely in the same position as the camera 709, projecting a light field conjugate to the calculated light field, will produce the light field that, when incident on the diffuser, will emerge to form a focus at the location of the spot on the screen 703. Similarly, if an image is projected onto the screen 703 using coherent laser light, the phase and/or amplitude distribution of the scattered light 705 may be calculated from the intensity distribution at the camera 709. The conjugate light field, then, may be projected by the light field projector to form a focused image on the surface 703 downstream from the diffuser 707.

Figure 7B:
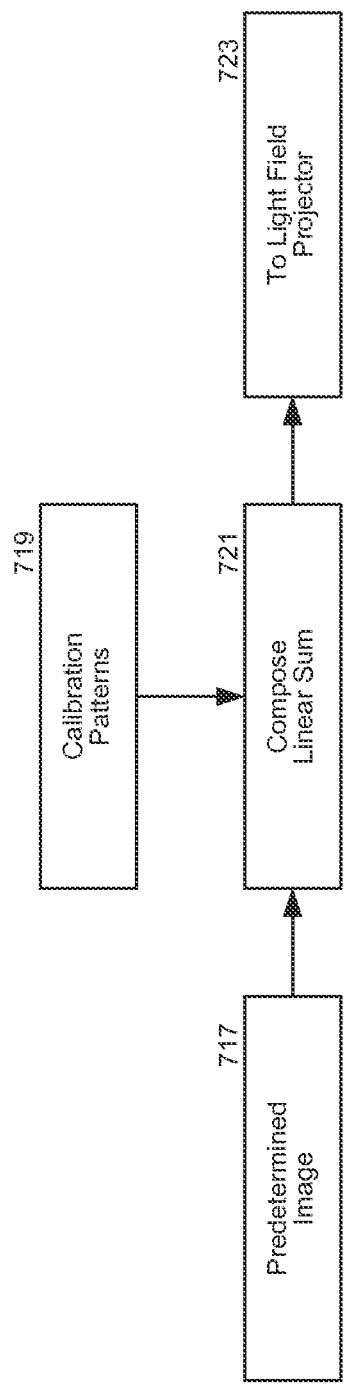
FIG. 7B illustrates some of the information flow involved in using a light field projector.

FIG. 7B illustrates some of the information flow involved in using a light field projector. As illustrated, a predetermined image 717 and the calibration patterns 719 for the particular system are taken as inputs to compose a linear summation 721 of the calibration patterns 719 for the individual points that constitute the predetermined image 717. This linear sum is then provided to the light field projector 723.

Second Calibration Method

In the second calibration method, illustrated in FIG. 8, a light field projector 801 directs a first light field 803 onto a diffuser 805. In some embodiments, the light field projector 801 can be, for example, a spatial light modulator illuminated by laser light emanating from a point. The first light field 803 is scattered by the diffuser 805, forming a second light field 807 downstream from the diffuser.

Some portion of the second light field 807 strikes a retroreflective bead 809, which retroreflects only light that strikes the bead. That light returns through the diffuser to form a light field on photodetector array 813, from which the phase and amplitude of the light field may be inferred. When the returned light onto the detector 813 is maximized, the emitted light field 803 is the light field which will focus to the center of retroreflective bead 809.

The light field projector 801 can be a reflective or transmissive type, and alters the phase of the reverse-path light to form the conjugate of the light which first illuminated the light field projector 801. A beamsplitter 811 directs the reverse-path light to a photodetector 813.

Figure 9A:
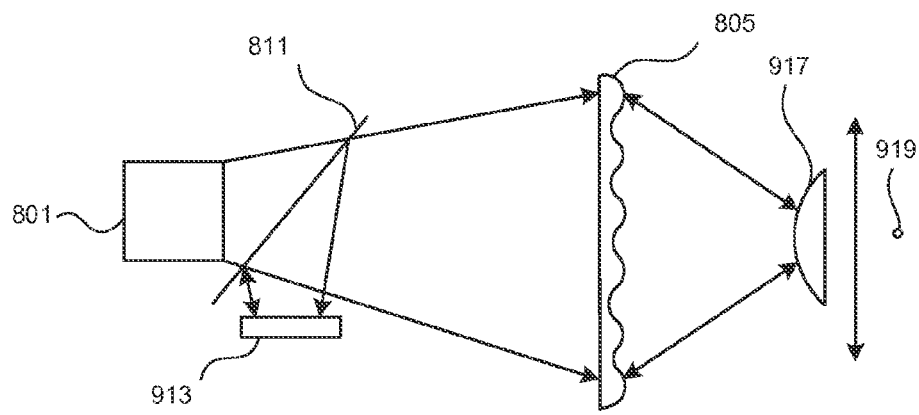
FIG. 9A illustrates an alternative way to calibrate the diffuser in a light field projector in which a convex spherical reflector is used.
Figure 9B:
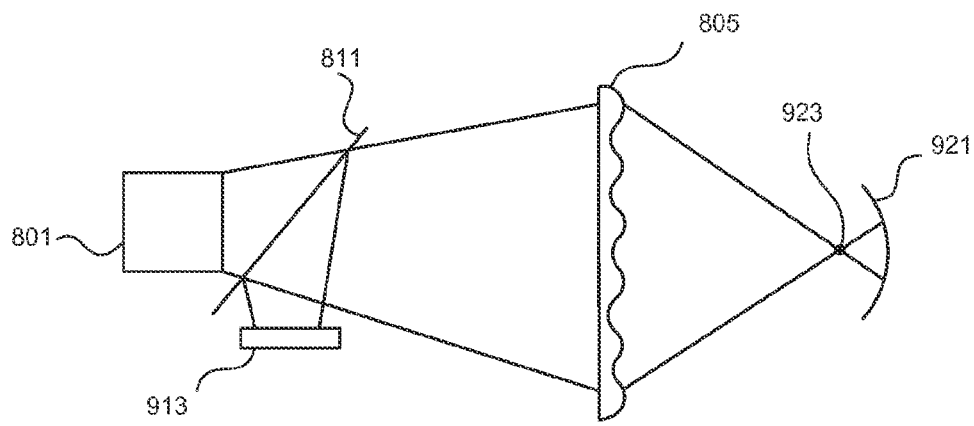
FIG. 9B illustrates another alternative way to calibrate the diffuser in a light field projector in which a concave reflector is used.
Figure 9C:
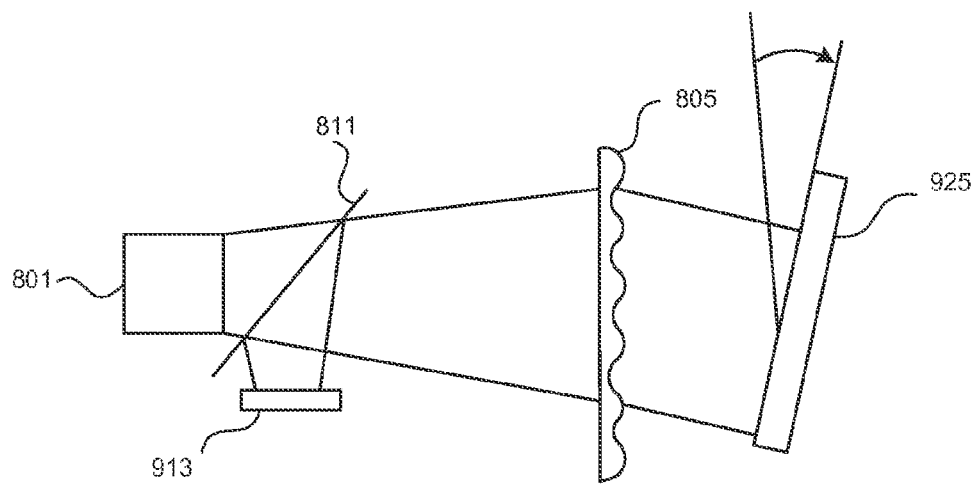
FIG. 9C illustrates another alternative way to calibrate the diffuser in a light field projector in which a plane mirror is used.

A variation on this method is shown in FIGS. 9A-9C. In FIG. 9A, a spherical convex mirror 917 is used to retroreflect light that converges toward a focus 919 corresponding to the center of curvature of the spherical surface; and in FIG. 9B a spherical convex mirror 921 is used to retroreflect light that converges towards a focus 923 corresponding to the center of the mirror's curvature. A photodetector array 913 is used to detect the returned light field which, when optimized, will be the conjugate of the light field emitted by the light field projector 801. Yet another variation on this method is shown in FIG. 9C and uses a plane mirror 925 (which, from a mathematical perspective is simply a spherical mirror whose radius of curvature is infinite) and results in calibration patterns corresponding to points at infinity.

Third Calibration Method

Figure 10:
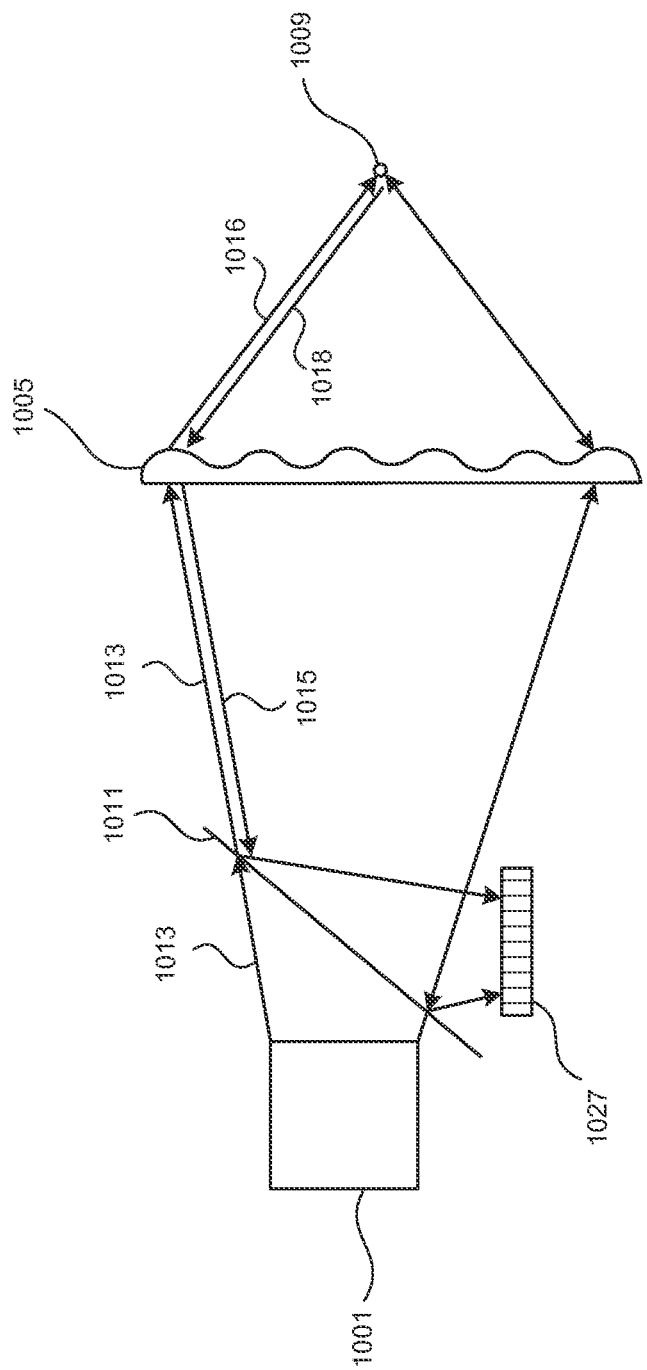
FIG. 10 illustrates another alternative way to calibrate the diffuser in a light field projector in which a retroreflective bead is used.

A third calibration method is illustrated in FIG. 10. This method is similar to the second calibration method described above, except that instead of directing the return light to a single photosensor 813 (FIG. 8), it is directed to a photosensor array 1027, whose location and position are equivalent to a reflection of spatial light modulator, which is the active component of light field projector 1001. If the light field 1013 projected by light field projector 1001 is perfectly focused via diffuser 1005 as light field 1016 onto a retroreflective bead 1009, then retroreflected back as light field 1018 and through the diffuser 1005 as light field 1015, essentially all of the light will return to beamsplitter 1011 and propagate to photosensor array 1027 and will have the same phase distribution as the light field at the projector 1001. However, the photosensor array 1027 will detect the intensity distribution of the return light, and not detect the phase distribution of the return light. In order to detect phase, a reference beam such as 711 (FIG. 7A) may be provided.

Although an interferometric arrangement as shown in FIG. 7A can be used fairly directly to infer the phase distribution, it is not necessary to use an interferometer. Instead, it is possible to take advantage of the close mathematical relationship between the known phase distribution of the light field at the projector 801 and the intensity distribution of the light field at photosensor array 1027. Because the light field at projector 801 is known, its intensity distribution may be calculated at any plane within the light field, using techniques well-known in the field of optics. The intensity distribution close to the projector 801 and the intensity distribution close to the photosensor 813 will be nearly identical when the light field is precisely adjusted to be brought to a focus at the retroreflective bead 809. The method known as the G-S algorithm may be adapted to do the optimization relatively quickly and in a highly parallelizable form as follows:

project an arbitrary light field
   subtract the calculated intensity distribution at the spatial light modulator from the received intensity distribution at the photosensor array to obtain an intensity error distribution.
   project a new light field, calculated by subtracting the square root of the intensity error distribution, times a damping constant, from the amplitude/phase distribution at the spatial light modulator.
   cycle through steps 2 and 3 until the received intensity distribution at the photosensor array closely resembles the calculated intensity distribution at the spatial light modulator.

Fourth Calibration Method

In the process of image construction described above, the magnitudes of individual object points are multiplied by corresponding calibration patterns, and the results are summed over all the object points, to obtain a light field pattern which, when projected through the diffuser, forms an image of the object. This would require recalling all of the calibration patterns for the nonzero object points in order to form each projection frame; and the number of such calibration patterns can easily be in the range of one to ten million. Accordingly, a method that does not require as many calibration patterns to be recalled is desirable. A fourth calibration method is illustrated in FIGS. 11A and 11B.

The memory effect may be harnessed to reduce the amount of data transfer needed to construct and project imagery using the current technology. Referring to FIG. 11A, the memory effect refers to the principle that, when a light ray 1101 is scattered by a diffuser 1103 to form a pattern 1105, a different light ray 1107 incident upon the same point in the diffuser 1103 but at a different angle is scattered to essentially the same pattern 1109, offset according to the change of incidence angle. This principle holds as long as the change of incidence angle is relatively small. "Relatively small" means that the angle change is small compared to the wavelength of the light divided by (pixL), where L is the thickness of the diffuser. For example, a ground glass diffuser has effectively zero thickness. FIG. 11B illustrates the memory effect for an image formed by a light field propagating through a diffuser or hologram. For example, a light field projector 1111 projects a light field towards the diffuser 1103 which scatters and creates an image 1113. Positioning the light field projector 1115 at a different location may generate essentially the same image 1117 but in a translated location depending on the properties of the diffuser 1103.

This means that, to a reasonably good approximation, if light field focuses to a point after passing through a diffuser, such that the focal point is on the optical axis at (x=0, y=0) a distance D beyond the diffuser, then the focal point may be moved to a new point (x=Δx, y=Δy) by simply tilting the light field at the diffuser by an angle θ, where: θ=sin$^{-1}$(sqrt (Δx$^2$Δy$^2$)/D$^2$). Moreover, the focal point may be moved to a new distance D+ED from the diffuser by applying a tilt that varies linearly with respect to distance from the axis. So, it is not necessary to recall, or even to record, a separate calibration pattern for every point in the object space if the diffuser is thin enough that theta is less than the wavelength of the light divided by (pixL). Instead, a few calibration patterns may be held in local memory and mathematically transformed or interpolated to generate calibration patterns necessary to form any desired image in the object space.

Selected Embodiments of Augmented-Reality Eyewear

Figure 12A:
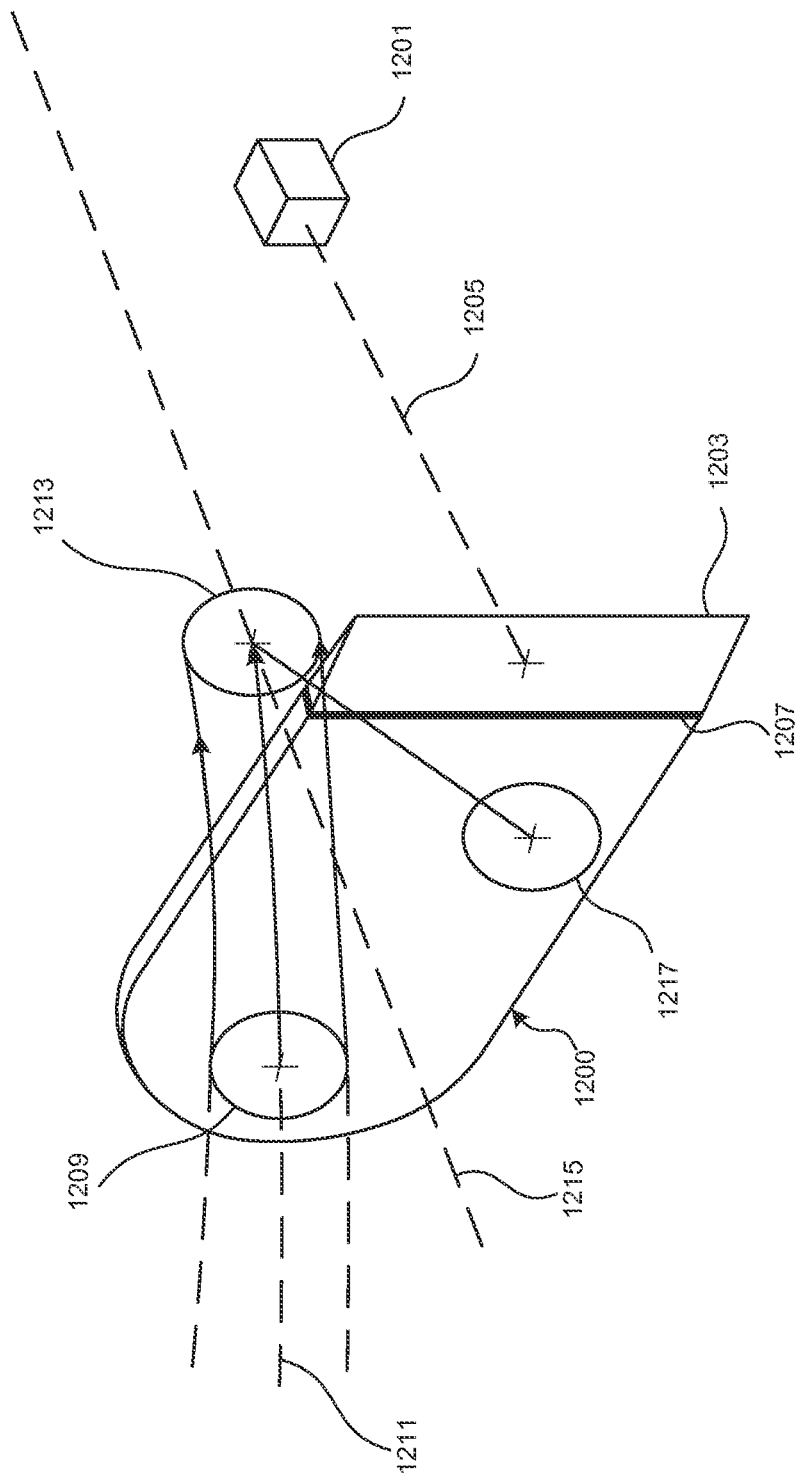
FIG. 12A illustrates a method for using a holographic element in augmented-reality eyewear or in other near-eye displays.
Figure 12B:
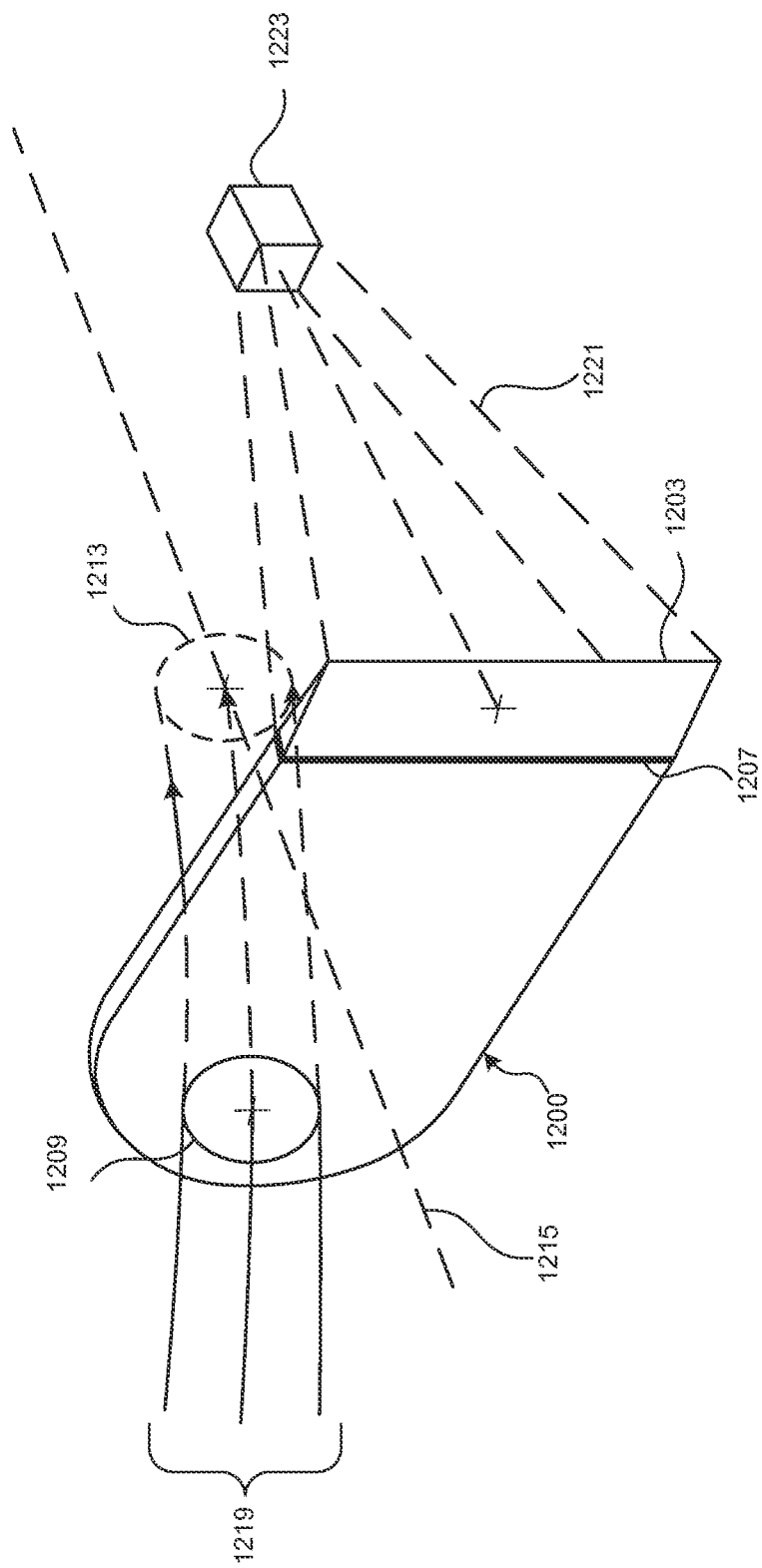
FIG. 12B illustrates a method for making one component of the holographic element of FIG. 12A.

FIGS. 12A and 12B illustrate an element 1200 for use in compact augmented reality eyewear. The eyewear may comprise a holographic directed diffuser, a 2-dimensional waveguide spatial light modulator, a laser light source, and a controller for the modulator. In particular, FIG. 12A illustrates a method for using a holographic element in augmented-reality eyewear. Laser 1201 illuminates coupler 1203 along optical axis 1205. Light propagates via total-internal reflection (TIR) through modulator 1207, enters the holographic element 1200, and is converted by the component 1209 of the holographic element 1200 into a collimated beam 1211 which enters the pupil of the user's eye at 1213, which is shown oriented along axis 1215. A second component 1217 of the holographic element 1200 is also shown, which would direct light to the pupil of the user's eye from a different direction 1215. FIG. 12B illustrates a method for making one component of the holographic element of FIG. 12A, using object beam 1219 and reference beam 1221 from a coherent light source 1223.

Internal to a multimode waveguide, propagation modes are superimposed but travel in different directions with different total internal reflection angles. Therefore, a light modulator element acting on a small portion of a waveguide will have a different effect on each mode, even if the modulated element acts with just one degree of freedom. An array of many such modulator elements acting at different points in the waveguide will affect all of the modes, each element providing an independent degree of freedom. Although it would be difficult to control any one mode using a single such element, the linearity of light propagation ensures that, with the number of such elements sufficiently greater than the number of modes to be controlled, some combination of control parameters applied to the various control elements will effectively control any selected mode while cancelling out the effects on other modes.

Any display or projector may be characterized by its number of degrees of freedom. A typical flat panel display with N pixels has N degrees of freedom. A light field projector with N projection elements, each of which projects M independently controllable light rays, has N×M degrees of freedom.

When a light field having N degrees of freedom illuminates a diffuser, the light field exiting the diffuser has N degrees of freedom. If the diffuser scatters each component of the illuminating light field into M different directions, the resulting exiting light field still has only N degrees of freedom. If M is greater than N, the quality with which an exit light field can be constructed is reduced, with noise in a ratio of approximately (M−N)/M. Accordingly, the quality of a light field projected using a diffuser as in this technology can be substantially improved by using a diffuser that scatters light only into a number of directions comparable to the number of degrees of freedom possessed by the light field projector that illuminates the diffuser.

Such a diffuser is called a "directed diffuser." One example of a directed diffuser is a holographic optical element. A method for producing a holographic directed diffuser is illustrated in FIG. 12B. Collimated laser light of a selected wavelength illuminates a holographic recording medium having the shape of an eyeglass lens, and light from a light field projector illuminates the same recording medium simultaneously. The collimated light and the projected light field are mutually temporally coherent. A series of N exposures are made, each with the collimated light having a different angle of incidence and with the projected light field having a different configuration. In some embodiments, each of the light field configurations is orthogonal to the other configurations, in the sense that the cross-correlation of any one configuration with any other configuration is zero. Fortunately, any two light fields with random phase distributions are mutually very nearly orthogonal.

FIGS. 12A and 12B illustrate, respectively, the use and the construction of a particular type of directed diffuser useful for projecting light fields with relatively few degrees of freedom, but still capable of conveying a wide-parallax three-dimensional image. The resulting holographic diffuser, when illuminated with any one of the light field configurations, will diffract light only into the direction of the collimated light that was used together with that configuration in recording the holographic diffuser. When two or more such illumination configurations are used, the diffuser emits the linear superposition of the corresponding beams (such as beam 1211). The degree to which light "leaks" into undesired directions depends largely on the degree of orthogonality of the different light field configurations.

In the setup of FIG. 12B, the collimated light in each exposure step fills the eyebox or aperture associated with the holographic element 1209. It is not necessary to fill the entire recording medium. If the entire recording medium is filled, the resulting holographic diffuser will diffract light to regions outside the eye pupil. In some embodiments, the collimated light only fills the "eyebox", and thus is emitted out from only a relatively small portion of the recording medium.

In some embodiments, the directions of incidence of the collimated light used in constructing the holographic diffuser are selected to form a rectangular array of angles, n angles high and m angles wide, for a total of n×m=N distinct angles. Because light scattering, at least as used in the current technology, is a linear process, illuminating the holographic diffuser with a linear superposition of any subset of the light field configurations used to construct the holographic diffuser will result in an exit light field constituting a linear superposition of the exit light fields corresponding to the illumination configurations. Therefore, in order to construct a virtual image of a 2-dimensional image at infinity, the holographic diffuser is illuminated by a superposition of the light field configurations corresponding to each of the points in the image. Of course, a point at infinity corresponds to a collimated beam traveling toward that point.

The light field projector in this embodiment is a waveguide modulator array having a minimum of N=n×m elements. For best results, N can be much bigger than n×m, on the order of 100 times larger. Larger N enables higher resolution and higher contrast in the projected image.

Figure 13:
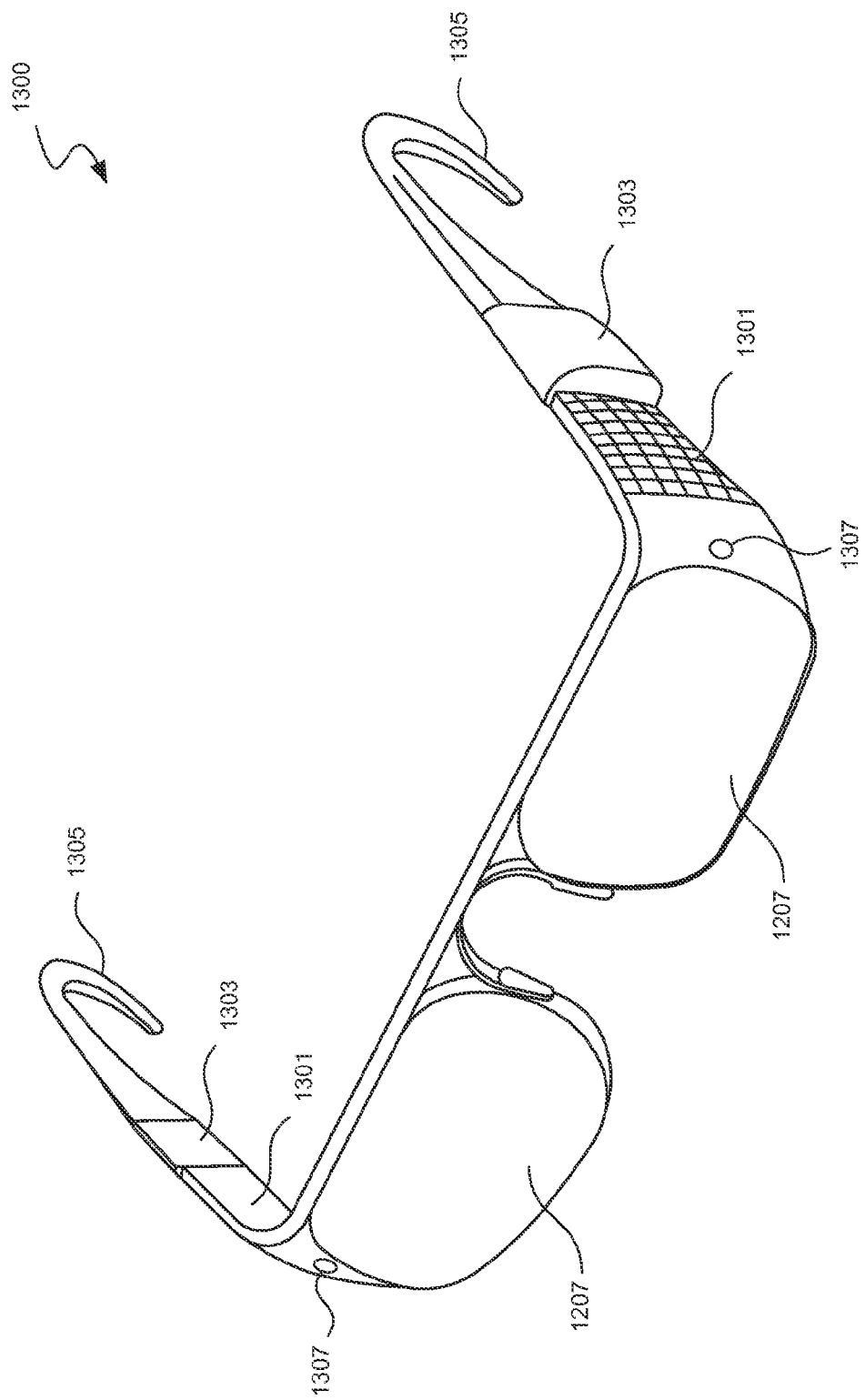
FIG. 13 illustrates a pair of augmented reality eyeglasses utilizing the holographic element of FIG. 12A.

FIG. 13 illustrates an augmented reality eyewear system 1300, with hologram 1207 as eyeglass lens, waveguide modulator array 1301 and controller 1303 integrated in to the temple arms 1305 of the eyewear 1300. Two such systems operating together, each serving as one lens of a pair of eyeglasses, can project one of a pair of stereographic images to each eye, thereby providing a three dimensional image. With a sufficiently fast controller, the images can be updated at 30 or more frames per second to provide a three dimensional video display. Cameras 1307 are embedded into the temple arms 1305 of the eyewear system 1300, and can be oriented to capture images (still or video) in the direction that the wearer faces. In some embodiments, in applications such as augmented reality, data from the cameras 1307 can be included to provide information to the controller 1303 regarding the environment and the location and orientation of the eyewear 1300 relative to the environment. It should be noted, if source 1223 is an array of independently addressable sources such as an OLED array, modulator 1207 may be omitted.

In some embodiments, the holographic element can be formed in a volume holographic recording medium such as dichromated gelatin, holographic polymer dispersed liquid crystal, or photopolymer. As is well known in the art of holographic optical elements, a volume hologram can, if properly recorded, be transparent to ambient light but diffract light of a specific wavelength with high angular and spectral selectivity. If the holographic diffuser is such a volume hologram, then the eyewear can be transparent to ambient light and provide a clear view of the environment, but at the same time provide a three-dimensional computer generated view or remotely recorded view superimposed on the environment.

The eyeglass lens 1207 can be a holographic element constructed using at least three wavelengths of laser light in the ranges of red, green, and blue, in a total of at least 3×N exposures. Substantially the same wavelengths are then used in the waveguide light field projector to provide a full-color three dimensional display. Because of the high angular and spectral selectivity of the holographic diffuser, there is negligible crosstalk between the red, green, and blue image components.

A significant advantage to using a holographic element in this and other embodiments of the technology is that it is not necessary to calibrate the diffuser (e.g., as described above) because it is constructed at the outset in such a way that there is a one-to-one correspondence between a set of light field projector controller states and the desired projected image pixels. Another significant advantage of using a holographic diffuser is that the diffuser is easily designed and constructed to maximize image contrast and resolution, as well as maximize light efficiency.

The embodiment described here is provided for informative purposes as an example of the technology. It does not define limits to the scope of the technology. Many variations on the structures and methods described are possible without departing from the scope of the technology. For example, the diffuser does not need to be holographic. It may be random or nonrandom. It may be transparent as in the case of a volume holographic diffuser, or opaque as in the case of a dense suspension of light scattering particles. It may be a wide angle diffuser or a narrow angle diffuser; and it may be a transmissive diffuser such as shower glass or a reflective diffuser such as a movie projection screen. The light field projector that illuminates the diffuser may be, for example, a waveguide light field projector, an array of lenses each backed by an emissive array such as an LED array or a VCSEL array, an array of lenses each backed by a transmissive array such as a LCD, or an array of reflective array such as an LCOS displays. The light source may be for example an external laser, an array of lasers, or an array of LEDs.

In augmented reality eyeglasses, visual information about the environment may be provided for example via video cameras mounted on the eyeglass frames, or by direct vision through transparent diffuser eyeglass lenses.

In the illustrated embodiment of FIG. 13, the light field projector and eyeglass lens together comprise a projection system that projects a light field which is perceived by the wearer as an image in the distance. Note that the image need not be at infinity nor at any specific fixed distance, and that the image can be a 3D image. In this case the system projects a virtual image to the wearer's eye. The eyeglass lens can be a diffusive material or a volume hologram. It is advantageous to use a volume hologram because it diffuses light only of a predetermined wavelength and propagation angle (or several predetermined wavelengths and angles). Accordingly, the vast majority of ambient light is transmitted through the eyeglass lens without being altered, while light from the light field projector is redirected to the user's pupil. As a result, the wearer can see through the eyeglass lens as if it were a simple transparent lens, but virtual images projected by the eyewear are perceived as overlain on the ambient scene. Thus, the eyeglass lens can independently perform the function of vision correction.

If the wearer's eye is considered to be part of the optical system, and if light field components correspond to specific patterns such as gratings or points on the eye's retina, then the virtual reality or augmented reality eyewear can compensate for aberrations in the eye, and even for cataracts and other such complex optical defects.

The embodiment as described above is not limited to use as an augmented reality display. For example, it may be used for viewing videos, or as a heads-up instrument display, or as a communication device. Also for example, it may be used in a virtual reality system or in a telepresence system such as a system for operating a drone or a robot.

Selected Embodiments of Three-Dimensional Display Panels

Figure 14:
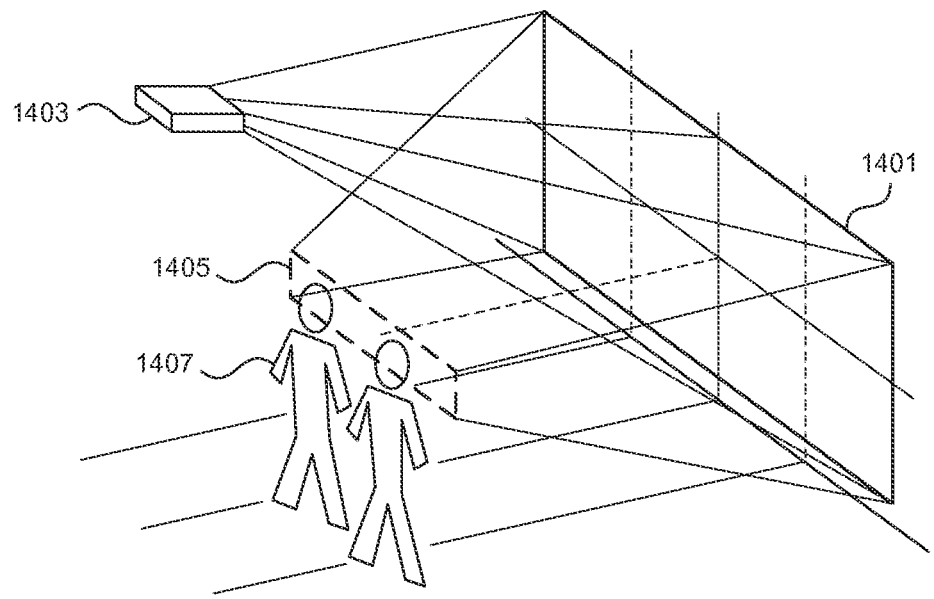
FIG. 14 illustrates a large reflective directed diffuser directing light only to an eyebox when illuminated by light field emitter.
Figure 15:
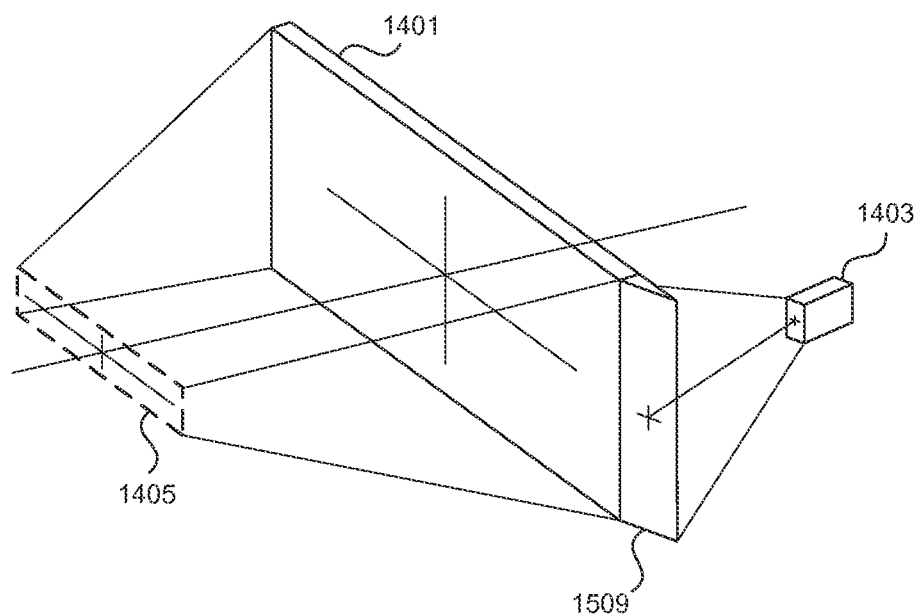
FIG. 15 illustrates an edge-lit directed diffuser used in a light field projection display.
Figure 16:
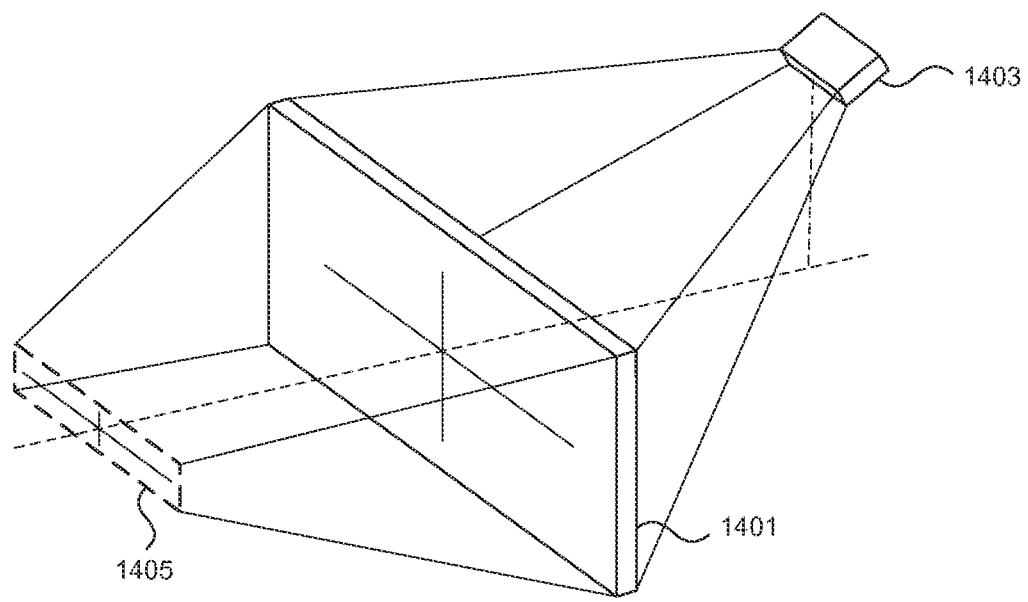
FIG. 16 illustrates a large backlit directed diffuser used in a light field projection display.
Figure 17:
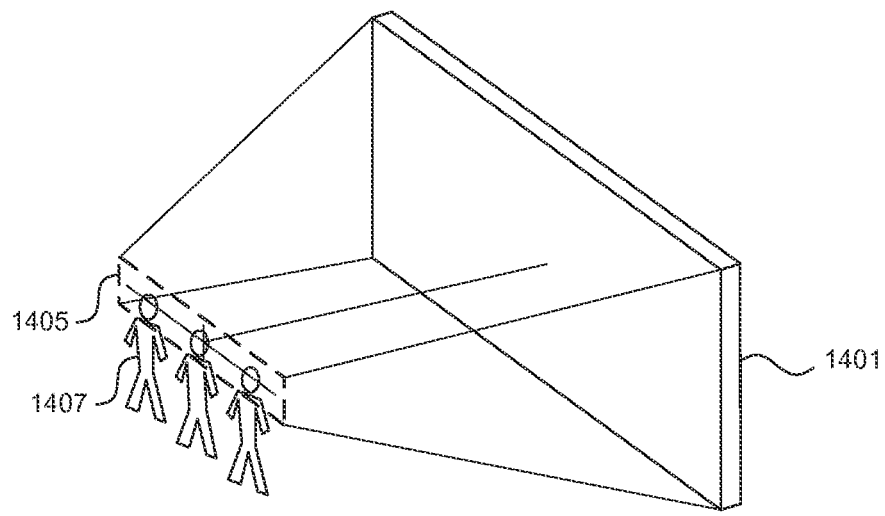
FIG. 17 illustrates several people viewing a 3-dimensional light field display through an eyebox.

The present technology also provides a three-dimensional display panel. With reference to FIG. 14, a large directed diffuser 1401 such as a holographic diffuser may be illuminated by a light field projector 1403 to provide a wide-angle, full-parallax three-dimensional display through an eyebox 1405 through which viewers 1407 can view the image. Illumination may be accomplished via reflection as in FIG. 14, via total internal reflection and an input coupler 1509 as illustrated in FIG. 15, or by transmission as illustrated in FIG. 16. It is advantageous for the diffuser to diffuse light only into an eyebox aperture where viewer's eyes will be, as illustrated in FIG. 17, both to maximize power efficiency and to reduce the number of degrees of freedom that must be controlled. Because it may be cumbersome and expensive to construct a holographic diffuser large enough for use as a three dimensional display panel, it may be desirable to manufacture the diffuser for this embodiment in the form of a surface relief structure which can be mass-produced by well-known methods such as UV casting, injection molding or pressure molding.

An advantage to the current technology in providing a three-dimensional display is that that each image point may be formed by rays converging or diverging from a wide range of angles. Therefore, any image point can be viewed from a wide range of angles. This is in contrast to three-dimensional displays that project stereographic views to a narrow range of angles or positions, so that when a viewer moves side to side, the image appears to jump.

When the light field projector has a large number of degrees of freedom, it is possible to construct an image point using ray bundles from selected directions. Thereby, image points may be given the appearance of being opaque or transparent. This is illustrated in FIG. 22, where light that might appear from a point behind projected object 2208 is absent as viewed from region 2205, while it is present as viewed from region 2207, thereby making object 2208 appear opaque.

Figure 22:
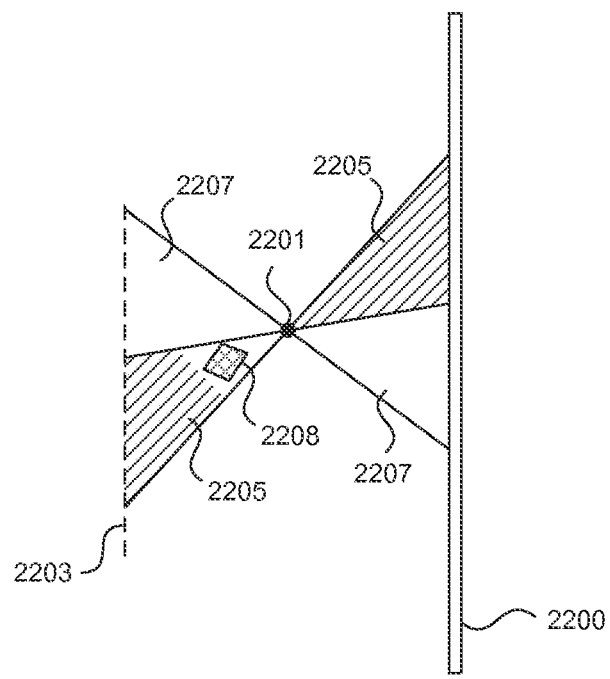
FIG. 22 illustrates a ray representation of a portion of a light field forming a real image of a cubical object and a point object, such that the cubical object appears to occlude the point object.

FIG. 22 illustrates a ray representation of a portion of a light field forming a real image. Light propagates from the diffuser 2200 towards a focal point 2201 and to a viewing plane 2203. A first portion 2205 of the light field forms a real image viewable from the viewing plane 2203, while the second portion 2207 of the light field does not form a real image visible from the viewing plane 2203.

It should be noted that any subset of the projected light field will form a corresponding subset of the desired light field in the projection volume, and that the resolution improves as the projected subset is made larger either by using a greater density of sampling or by using a wider range of sampling angles. The current technology is not limited to projecting light wave fields. It is applicable to projecting any kind of wave field including fields of light waves, ultrasonic waves, seismic waves, water surface waves, surface plasmon waves, microwaves, terahertz waves, x-ray waves, audible sound waves, and even quantum waves of atoms and subatomic particles. In each case, a wavefront shaper is required, capable of shaping the type of waves in the projected wave field.

Reflective wavefront shapers are possible for all types of waves for which reflective interfaces exist. A deformable mirror, for example, is commonly used in adaptive optics. For example, a deformable mirror or an array of small mirrors individually driven by piezoelectric devices can perform wavefront shaping on light, microwaves, x-rays, or acoustic waves. An array of phase modulators can perform wavefront shaping on light, microwaves, acoustic waves, surface plasmon waves, electron quantum waves, or electron waves.

A common type of wavefront shaper comprises an array of liquid crystal filled elements, each electrically addressed. By varying the voltage across an element, the retardance of the liquid crystal layer is varied with respect to a particular polarization direction, resulting in a controllable phase shift in light passing through that element and having that particular polarization. Liquid crystal wavefront shapers exist both in reflective and transmissive types.

A wavefront shaper is not limited to phase shifting. Though less efficient than a phase-only wavefront shaper, an amplitude-only wavefront shaper can work well. The diffusive medium serves to diffuse the type of wave being projected. For example, titania particles suspended in a gel, glass or polymer slab can be used to diffuse light. Microbeads suspended in a gel can diffuse light or acoustic waves. Media such as ground glass, bathroom glass, or bumpy reflective surfaces can be used to diffuse light. Similarly, bumpy slabs of any material in which the propagation speed is different from the surrounding material can serve as a diffuser of waves. Microwaves have a different propagation speed in paraffin than in air for example. Surface topography, doping patterns, and other such features that locally affect the propagation speed of surface plasmon waves can diffuse surface plasmon waves.

"Projection volume" can refer to a three-dimensional region, a two-dimensional region, or even a one dimensional region. For example, surface plasmon waves travel along a surface as do surface waves on water and surface acoustic waves. In embodiments of the current technology, the wave field projector can project surface waves which are redirected by a diffusive medium to form an object wave field which forms a predetermined pattern within the projection volume, which is a region on the surface on which the surface waves propagate.

Additional Applications

The ability to form a predetermined focused image by propagating an appropriate light field through (or reflecting it from) diffusing media enables heretofore impossible image projection applications. Some examples include: Projecting images onto surfaces of arbitrary shape; Projecting wide-angle real and virtual 3D images; Virtual Reality eyewear; Augmented Reality eyewear; Immersive Virtual Reality environments, Camouflage, Acoustic surgery, and Beam Steering. Some of these practical applications deserve further explanation.

It is advantageous to project images onto arbitrary shapes in photolithography, in order to form patterns that conform to a surface such as a missile nose cone, an airfoil, or a lens. For example, a light sensor array on the curved back surface of a spherical refractive ball can make a very wide-angle camera.

Figure 18A:
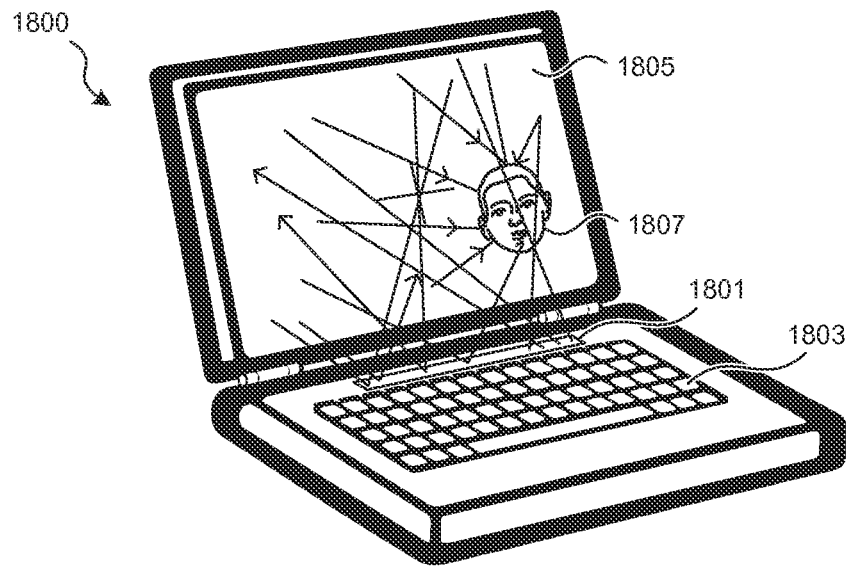
FIG. 18A illustrates a 3-dimensional image displayed on a laptop computer employing a light field projector.
Figure 18B:
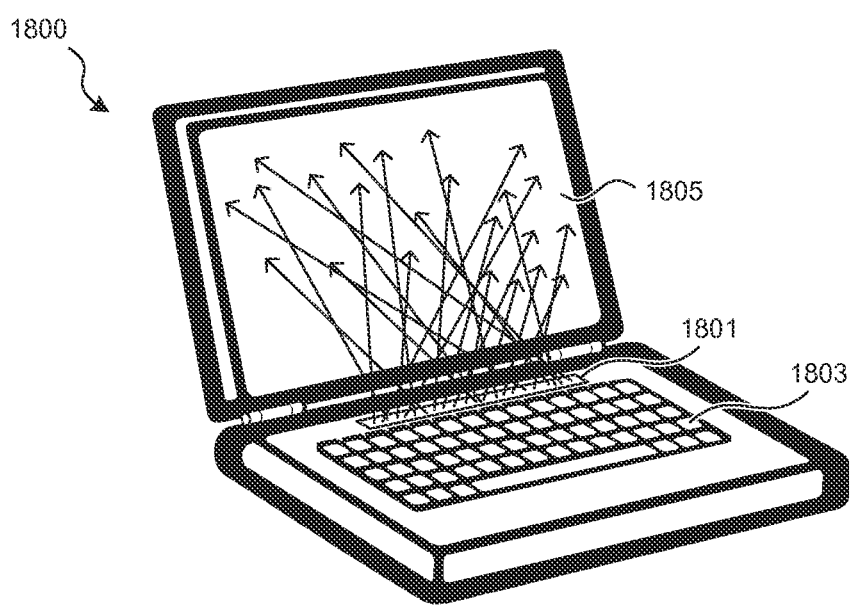
FIG. 18B illustrates rays from a light field emitter striking a diffusive screen on a laptop.
Figure 18C:
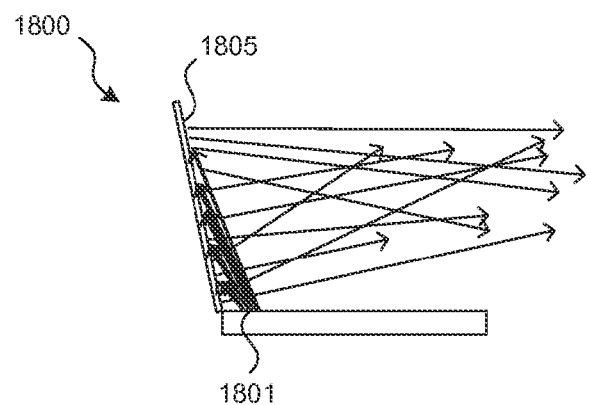
FIG. 18C is a side view of the system illustrated in 19B, further showing a downstream light field formed by the diffusive screen.

FIGS. 18A-18C illustrate a laptop computer 3D display enabled by the current technology. As illustrated, a laptop 1800 includes a light field projector 1801 disposed above the keyboard 1803. The light field projector 1801 projects light towards a diffusive screen 1805, which then scatters the light which focuses to form an image 1807 in a space in front of the screen 1805.

Figure 19:
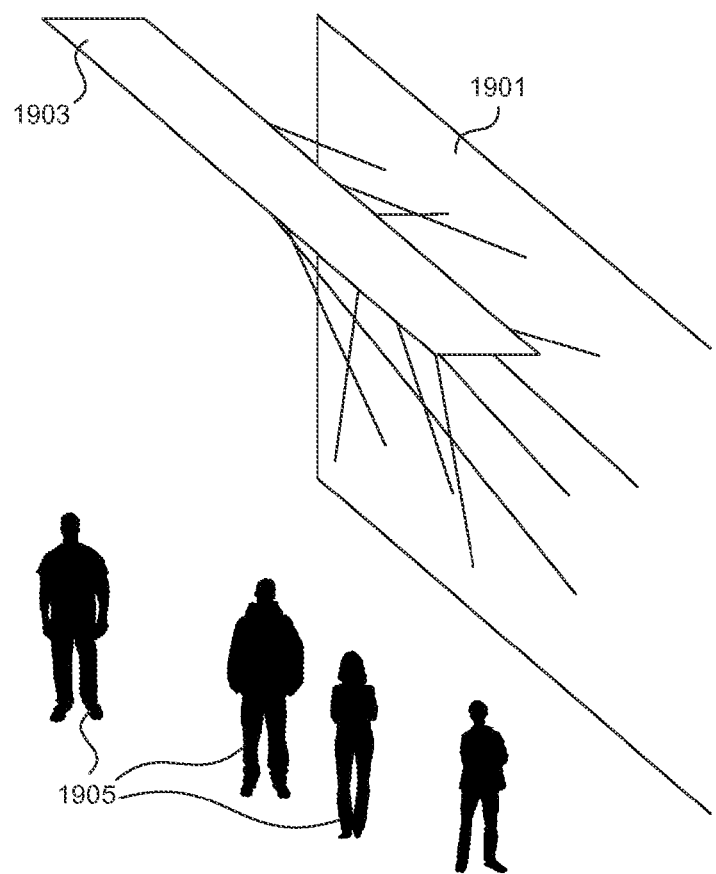
FIG. 19 illustrates a room-sized 3D display in which the light field emitter is overhead and the diffuser is reflective.

An immersive virtual reality environment can be constructed according to the current technology as illustrated in FIG. 19. Diffusive panels 1901 are on all the walls, and light field projectors 1903 are located in panels overhead. The system can project any 3D scene at all into the room via the projectors and diffusive panels, and users 1905 can move freely within the scene.

If the present technology is used to project a 3D image relatively near to a large diffusive panel, the viewing angle of the 3D image depends on the width and position of the panel relative to the 3D image, rather than width and position of the light field projector relative to the 3D image. So, even if the diffusive panel is reflective and the light field projector is behind the viewer, the viewer does not cast any more than a very diffuse shadow on the panel.

Figure 20:
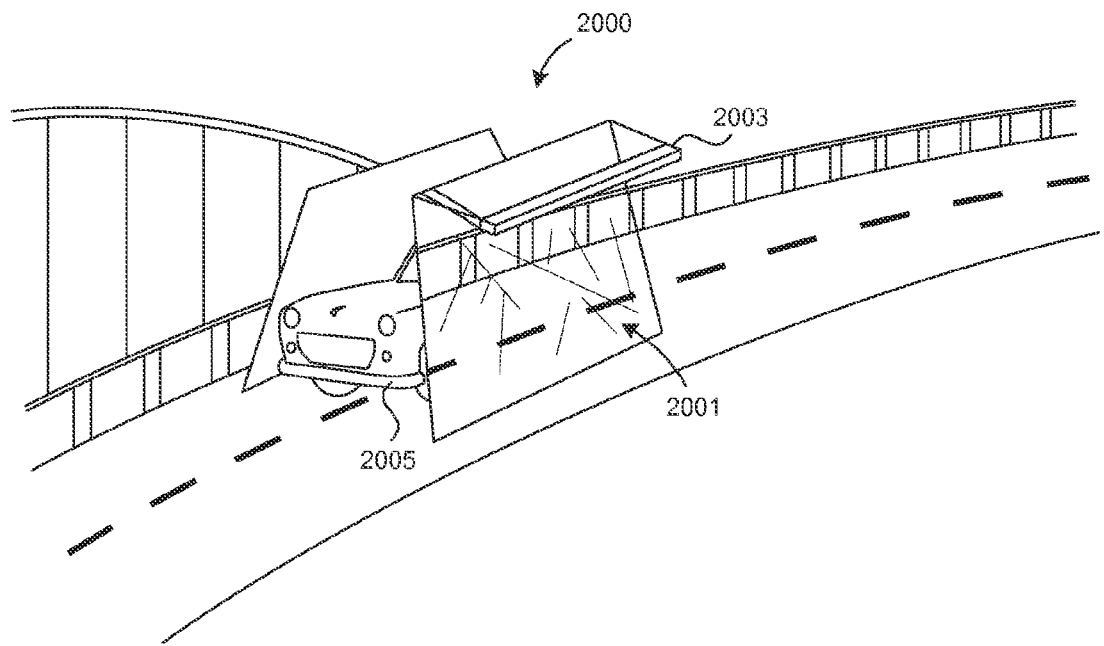
FIG. 20 illustrates a camouflaged vehicle displaying a 3D image of the background.

A vehicle camouflage system 2000 is illustrated in FIG. 20, including diffusive panels 2001 and overhead light field projectors 2003 configured to direct light onto the diffusive panels 2001. It is possible to use the current technology to project arbitrary 3D images using the sides of a vehicle 2005 as diffusive panels 2001 and thereby camouflage the vehicle. If the projected imagery corresponds to the 3D scene behind the vehicle 2005, the vehicle will be effectively invisible. In the drawing of FIG. 20, flat diffusive panels 2003 are shown for simplicity, however in some embodiments the diffusive panels can be replaced by a complexly curved surface, for example one which follows the contours of the vehicle 2005.

It is important to note that the current technology is not limited to static projections. By frequently updating the projected image, it is possible to project 3D video. On a larger scale, it is possible to project 3D imagery in a movie theatre. An advantage to the 3D images projected by the current system is that the images can be visible with full perspective and parallax from all locations within a viewing volume, as if they were actual 3D objects.

Figure 21:
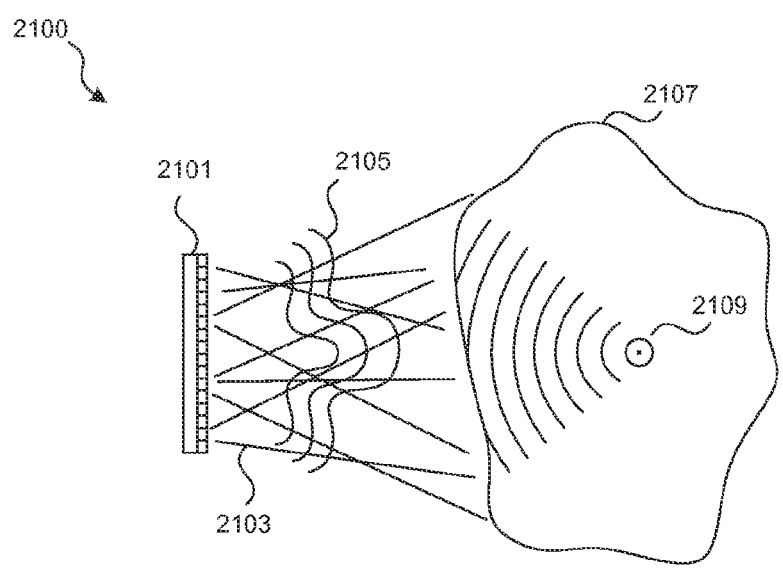
FIG. 21 illustrates an ultrasound wave field projector and focusing of ultrasound waves via diffusive media.

The current technology can also be advantageous for use in ultrasound surgery because it enables precise selection of the particular region of tissue in which ultrasound will be focused. FIG. 21 illustrates an ultrasonic surgery system 2100 in which an ultrasound wavefield projector 2101 produces ultrasonic waves 2103 which, when diffused through the diffusing media 2105 and through the tissue 2107, focus in the focal region 2109, for example at a surgical site.

The current technology can be used to project an underwater acoustic image which, to unfriendly acoustic sensors, appears to be a real ship, submarine, or obstacle. Similarly, it can be used to project a microwave wave field via reflection from static ground features, such that to unfriendly radar sensors the microwave wave field appears to be a real airplane, vehicle, or other object.

The current technology can be used to project a visible 3D image via a diffusive surface such as the wall of a building, to give the impression that a person or object is present when not actually present.

Figure 23:
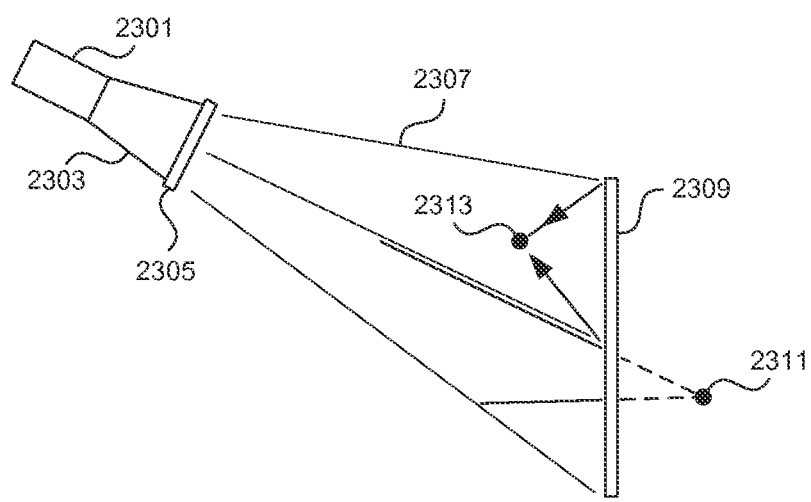
FIG. 23 illustrates a light field projector displaying both a real image and a virtual image.

FIG. 23 illustrates a light field projector 2301 whose light 2303 is incident on a first diffuser 2305 which scatters and propagates second light wave 2307 toward a second diffuser 2309. When the second light wave 2307 interacts with the second diffuser 2309 both a real image 2311 and a virtual image 2313 are displayed. Light field 2303 is a combination of the fields 2311 and 2313.

Figure 24:
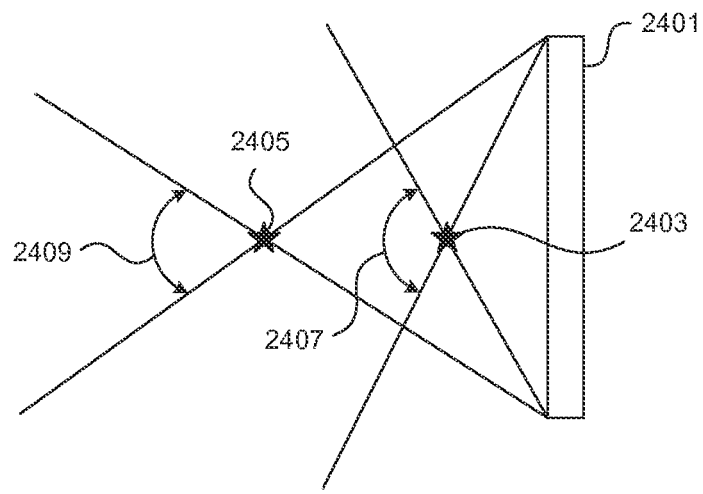
FIG. 24 illustrates the range of viewing angles available to projected image points from a diffuser.

FIG. 24 illustrates the range of viewing angles available for a projected image from a diffuser 2401 at points 2403 and 2405. As illustrated, the image at point 2403 will have a much larger viewing angle 2409 than the viewing angle 2409 associated with the image at point 2405, because point 2403 is closer to the diffuser 2401.

Figure 25:
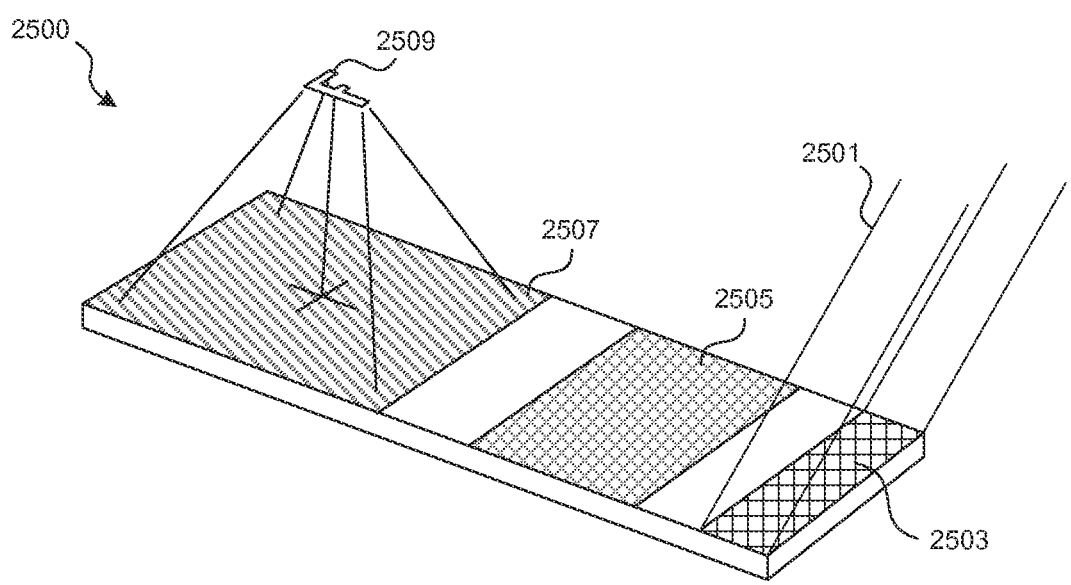
FIG. 25 is an alternative representation of a light field projector element useful, for example, in a near-eye display.

FIG. 25 is an alternative representation of a light field projector element 2500 in a slab-like form factor. In use, light 2501 strikes coupler 2503, passes via total-internal reflection through modulator array 2505, and is diffracted by holographic element 2507 to form an image 2509. This is the preferred form factor for eyewear applications.

Figure 26:
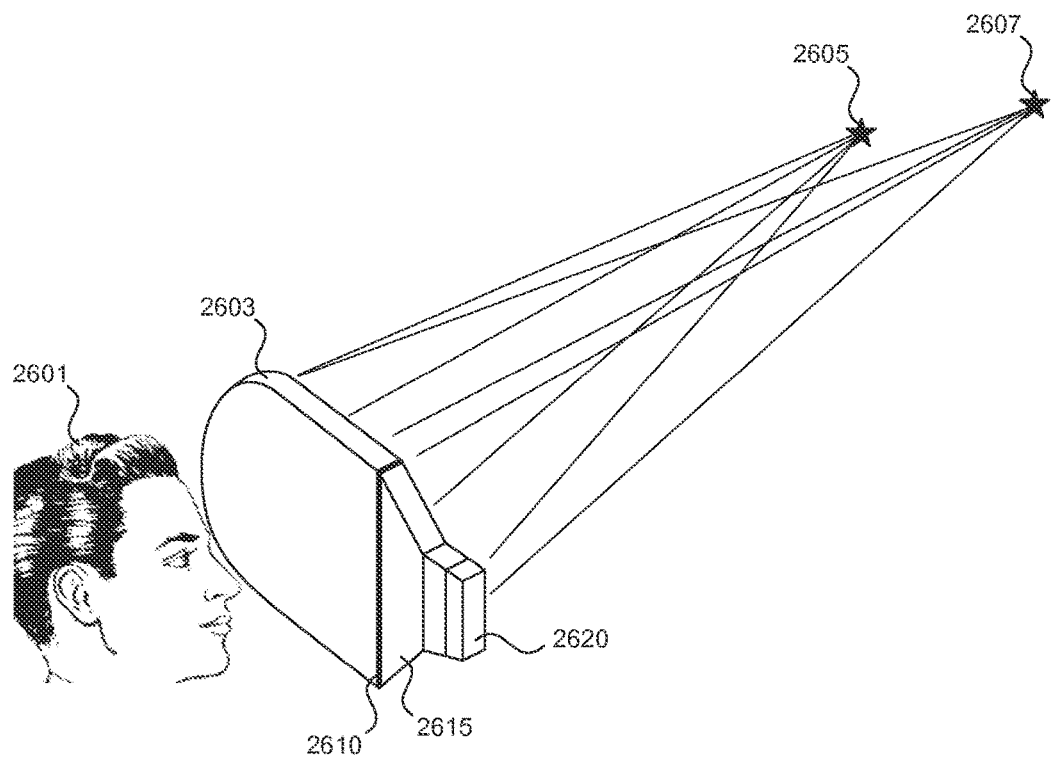
FIG. 26 illustrates a user gazing through one light field projector element in a near-eye display.

FIG. 26 represents a user 2601 gazing through one light field projector element 2603 in a near-eye display. Images 2605 and 2607 appear to the user 2601 to be in the far field. Light from light source array 2620 is transmitted through total-internal-reflection waveguide 2615 and shaped by modulator 2610, then enters holographic eyeglass lens element 2603 where it is then diffracted to form images 2605 and 2607.

Figure 27:
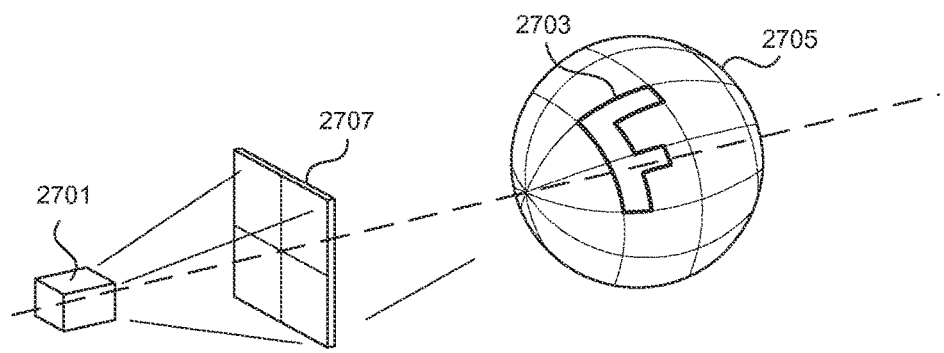
FIG. 27 illustrates the use of a light field projector to form an in-focus image on a non-planar surface.

FIG. 27 illustrates the use of a light field projector 2701 to form an in-focus image 2703 on a non-planar surface 2705. As illustrated, light from the projector 2701 passes through diffuser 2707 and is then focused to the surface 2705 to generate the image 2703.

In various embodiments, it can be advantageous to use the current technology for beam steering when it is desired to direct a light beam, ultrasonic beam, or microwave beam simultaneously to a plurality of targets. In that case, the "image" formed by the object wave field can be a plurality of point foci, one focus on each target.

It should be noted that, although the above description of the current technology deals only with light fields that do not change rapidly, it is possible with today's technology to control spatial and temporal phase of a light field on the scale of microns and femtoseconds. A light pulse a few tens of femtoseconds long only has a longitudinal extent on the order of a micron. If such a pulse spreads widely across a diffuser substantially larger than a micron, the resulting light field will arrive at any given point downstream not as a single pulse but as illumination whose strength and direction of incidence varies widely and rapidly. If the light field is coherent, all of the light simultaneously incident at any point will interfere, but the interference pattern will vary rapidly. If the light field contains multiple light frequencies, the light spectrum at the point will vary rapidly.

In the calibration process of the current technology, it is possible to control both spatial and temporal shape of a light pulse to maximize both spatial and temporal convergence of the light field after it passes through (or is reflected off of) a diffuse reflector onto a reflective particle in a projection volume or onto a predetermined pattern such as a grating on an arbitrary surface. The spatial/temporal shape of the light pulse thus comprises a component pattern for forming arbitrary spatiotemporal pulsed light fields or images in the projection volume.

Similarly, current technology makes it possible to control the polarization of light fields along with spatial and temporal shape (as described in U.S. Pat. No. 7,352,469 to McGrew, entitled Quantum Resonance Analytical Instrument, which is hereby incorporated by reference in its entirety). Therefore, the current technology enables projection of a predetermined pulsed light field with controlled spatial and temporal shape and polarization.

Hardware and Software Considerations

The wave or light field projector(s), photodetectors, and/or photosensor arrays can be coupled to a processing unit for controlling the projectors and/or for analyzing the output of the photodetectors or photosensor arrays. The processing unit can be a computing device that includes a suitable processor or central processing unit (CPU) that processes data in accordance with computer-readable instructions stored on system memory. The CPU, for example, can control performance of the various routines described herein and can provide input to control the wave or light field projector. The CPU may be any logic processing unit, such as one or more CPUs, digital signal processors (DSPs), application-specific integrated circuits (ASICs), etc. The CPU may be a single processing unit or multiple processing units in a device or distributed across multiple devices. The CPU is connected to a memory and may be coupled to other hardware devices, for example, with the use of a bus (e.g., a PCI Express or Serial ATA bus). The CPU can include, by way of example, a standard personal computer ("PC") or other type of embedded computer running any suitable operating system, such as Linux, Windows, Android, iOS, MAC OS, or an embedded real-time operating system. In some embodiments, the CPU can be a small form factor PC with integrated hard disk drive ("HDD") or solid-state drive ("SSD") and universal serial bus ("USB") or other ports to communicate with the other components. In other embodiments, the CPU can include a microprocessor with a stand-alone motherboard that interfaces with a separate HDD. The memory can include read-only memory (ROM) and random access memory (RAM) or other storage devices, such as disk drives or SSDs, that store the executable applications, test software, databases and other software required to, for example, implement the various routines described herein.

In some embodiments, the processing unit can be connected via hardwired connection to the wave or light field projector, while in other embodiments the processing unit can be remote from the projector.

In the worst case, where the diffusing media are multiple and far apart, the light field patterns that encode each image point are uncorrelated. In other words, the memory effect is so small that it is not useful. So, in that case, every point in the projection volume would be calibrated to the diffusing media individually.

Statements herein referring to a light field projector can be interpreted as referring to wave field projectors in general, with the proviso that the projector projects a wave field of some type, the diffusive or scattering medium redirects waves of that type, and the object wave field is of that type. Wherever the word "diffuse" or its derivative is used, the word "scattering" or its corresponding derivative has the same meaning and vice versa. In the case of a holographic element, the projected image or image points are formed by diffraction rather than ordinary diffusion, but for convenience I have in some cases referred to light being "diffused" by a holographic element rather than being "diffracted" by the element. In those cases the meaning is effectively the same.

A light field projector can easily contain millions of independent elements, so a light field corresponding to one point in the projection volume is typically represented by millions of values. To project a given 3D image comprising N points, it can be necessary to superimpose N sets of component light fields. This can require manipulating tens to hundreds of billions of numbers, as well as storage and retrieval of all of the requisite component light fields. In order to project a 3D video image at full resolution, on the order of 30 composite light fields will need to be computed per second. Available computer hardware such as a multi-CPU/multi-GPU computer can process tens of thousands of video frames per second.

There are many ways to find the light field patterns that, when used to illuminate a diffuser, result in formation of a desired image downstream from the diffuser. The process of finding those light field patterns is referred to herein as "calibration" of the diffuser, though it is understood that in fact it is calibration of the combination of diffuser, light field projector, and controller.

Conclusion

"Light field" refers to the set of light rays in a volume of space. Equivalently, "light field" refers to the set of light wavefronts in a volume of space or passing through a surface and propagating therefrom. In the case of a display, "light field" may consist of a series of light fields which are perceived by the observer as if they, together, are a single light field as in sub-frame projection.

"Wave field" refers to the set of wavelengths and propagation vectors of any selected type of wave in a volume of space or passing through a surface and propagating therefrom.

A wave field projector is any device that projects a wave field of a predetermined type, which can be controlled or specified by a controller.

A "light field projector" is any device that projects a light field which can be controlled or specified by a controller. For example, a light field projector can be one or more coherent or incoherent light sources, projection optics, and a spatial modulator for each light source. The spatial modulators can modulate any of phase, amplitude, and/or polarization.

Although a lens or multiple lenses can be incorporated into a light field projection system, a light field generator does not necessarily require any lenses. For example, the light field projector might be a large phased array of laser diodes, each of which emits a spherical wave. Alternatively, it might be an array of liquid crystal elements or deformable mirror elements illuminated by a plane wave of light. Many other types of light field generators are available and possible. The present technology does not depend on the type of light field generator used.

The term, "scatterer" refers to a wave scatterer. Often, but not always, the term "scatterer" connotes a wave scatterer whose scattering function varies on a very short length scale. A light diffuser or a scatterer can be, for example, opal glass, ground glass, a suspension of scattering particles, an array of small lenslets, an array of small prisms, or generally any medium that randomly or quasi-randomly redirects light at each point on the medium. Another example of a scatterer is a holographic element. A holographic element that converts each of an arbitrary set of point source light fields to a corresponding to specific light field component is herein also referred to as a "holographic diffuser," although that is not what is traditionally meant by "diffuser."

The term, "waveguide" refers to any structure, device, or component whose function is to confine light to a narrow range of paths. For example, a waveguide can be an optical fiber which confines light to a plurality of totally reflected modes inside the fiber), a planar waveguide such as a glass plate which confines light to the inside of the plate by total internal reflection at the glass/air interface, The term, "input coupler" means any structure or component that redirects light into a waveguide from a light field external to the waveguide. For example, a prism or a bevel at one edge of a glass plate can redirect light from a certain range of incident angles in the air, into totally internally reflected modes within the glass plate and therefore may be an input coupler. Another example of an input coupler is a grating or holographic optical element that diffracts externally incident light into totally internally reflected modes internal to a plate.

The term, "output coupler" means any structure or component that redirects light incident from totally internally reflected modes in a waveguide, into a light field propagating externally to the waveguide. An output coupler is often structurally identical to an input coupler, except that the light propagates in the opposite directions relative to an input coupler and an output coupler.

The term, "three-dimensional image" may refer to a non-planar image, a point-cloud, or a planar image in a three-dimensional volume.

In the context of the present disclosure, the term "modulator" means any device, component, structure or element that, when activated, affects the phase, amplitude, direction, or polarization of light passing through the active region of the device, structure or element in a controllable way. For example the following items may be considered to be "modulators": transmissive liquid crystal displays, reflective liquid crystal displays, deformable mirrors, electrically or optically controlled absorbers, acousto-optic modulators, electrochromic displays, and micromirror arrays.

The term, "near-eye display" means any device whose function is to produce a controllable light field that comprises a virtual image such that when the device is placed at a small distance (typically smaller than about 3 inches) from an eye, the eye perceives the virtual image at a much greater distance (typically in the range from 2 feet to infinity).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. When statements or subject matter in an incorporated by reference conflict with statements or subject matter of this application, then this application shall control.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C sec. 112, sixth paragraph 112(f) (AIA), other aspects may likewise be embodied as a means-plus-function claim, or in other forms, such as being embodied in a computer-readable medium. (Any claims intended to be treated under 35 U.S.C. § 112, ¶6(f) will begin with the words "means for", but use of the term "for" in any other context is not intended to invoke treatment under 35 U.S.C. § 112, ¶6(f).) Accordingly, the applicant reserves the right to pursue additional claims after filing this application to pursue such additional claim forms, in either this application or in a continuing application.

EXAMPLES

1. A system for projecting an object wave field into a projection volume, comprising:
    a wave diffuser;
    a wave field projector configured to project a wave field onto the wave diffuser; and,
    a controller coupled to the wave field projector, wherein the controller is configured to cause the wave field projector to project a wave field that, upon interacting with the wave diffuser, is redirected to form an object wave field that forms a predetermined pattern in the projection volume.

2. The system of example 1, wherein:
    the wave field projector comprises a light field projector,
    the wave diffusive medium comprises a light diffuser, and
    the object wave field comprises an object light field.

3. A three-dimensional image projector comprising the system of example 2, wherein the object light field forms a three-dimensional image.

4. A camouflage system comprising the system of example 2.

5. A heads-up display comprising the system of example 2.

6. The heads-up display of example 5, wherein the light diffuser comprises a volume hologram configured to diffuse light of a plurality of predetermined wavelengths, and
    wherein the light field projector is configured to project a light field comprising the predetermined wavelengths.

7. An acoustic surgical system comprising the system of example 1, wherein wherein:
    the wave field projector comprises an acoustic field projector;
    the wave diffuser comprises an acoustic diffuser; and
    the object wave field comprises an object acoustic field.

8. A near-eye display, comprising:
    a holographic element configured to be positioned in front of a wearer's eye;
    a light field projector configured to project a first light field into the holographic element via an optical coupler; and
    a controller coupled to the light field projector, wherein the controller is configured to determine the first light field and to cause the light field projector to project the first light field,
        such that the holographic element redirects the first light field to form a second light field directed into the wearer's eye, and
        such that the second light field is perceptible by the wearer as a virtual image at a distance from the eye and the holographic element.

9. The near-eye display of example 8, wherein the holographic element is contained within a flat or curved slab of translucent material.

10. The near-eye display of example 8, wherein the holographic element is configured to redirect light of a predetermined color and transmit light of other colors without substantial redirection.

11. The near-eye display of example 8, wherein the second light field further forms a three-dimensional image.

12. An eyewear assembly comprising the near-eye display of example 8, the eyewear system comprising:
    a frame configured to be worn on the head of the wearer, the frame including first and second rims with lenses affixed therein, and first and second temple arms extending away from the first and second rims.

13. The eyewear assembly of example 12, wherein the holographic element is integrated into at least one of the first and second lenses.

14. The eyewear assembly of example 12, wherein the light field projector and the controller are integrated into one of the first and second temple arms.

15. The eyewear assembly of example 12, further comprising a second near-eye display.

16. A method of manufacturing a near-eye display, comprising:
    manufacturing a holographic element configured to be positioned in front of a wearer's eye;
    disposing an optical coupler with respect to the holographic optical element;
    disposing a light field projector with respect to the optical coupler such that the light field projector is configured to project a first light field onto the holographic element via the optical coupler; and
    providing a controller coupled to the light field projector.

17. The method of example 16, wherein manufacturing the holographic element comprises:
    providing a holographic recording medium;
    illuminating the holographic recording medium with a reference beam from a first angle of incidence, while illuminating the holographic recording medium with light from the light field projector in a first configuration, wherein light from the light field projector is temporally coherent with the collimated reference beam.

18. The method of example 17, further comprising:
    illuminating the holographic recording medium with the reference beam from a second angle of incidence, wherein the second angle is different from the first angle, while illuminating the holographic recording medium with light from the light field projector in a second configuration, wherein the second configuration is different from the first configuration.

19. The method of example 18, wherein the first configuration is orthogonal to the second configuration.

20. The method of example 17, wherein the holographic recording medium is embedded in a slab of translucent material.

21. A three-dimensional image projection system, comprising:
   a light scatterer;
   a light field projector configured to project light onto the light scatterer; and,
   a controller coupled to the light field projector, wherein the controller is configured to:
   determine a first light field; and,
   cause the light field projector to project the first light field onto the light scatterer,
      wherein when the first light field is scattered by the light scatterer, the first light field forms a second light field, and
      wherein the second light field forms a predetermined three dimensional image.

22. The three-dimensional image projection system of example 21, wherein the predetermined three-dimensional image comprises a real image.

23. The three-dimensional image projection system of example 21, wherein the predetermined three-dimensional image is a virtual image.

24. The three-dimensional image projection system of example 21, wherein the predetermined three-dimensional image is focused conformally onto a nonplanar surface.

25. The three-dimensional image projection system of example 21, wherein the light field projector comprises:
   a light source;
   a waveguide;
   an input coupler configured to receive light from the light source and couple the light into the waveguide such that the coupled light propagates within the waveguide via total internal reflection;
   an array of modulators within the waveguide, the modulators configured to alter the phase, amplitude, or polarization of the light propagating within the waveguide; and
   an output coupler configured to redirect the modulated light out of the waveguide.

26. The three-dimensional image projection system of example 25, wherein the array of modulators comprise spatial light modulators.

27. The three-dimensional image projection system of example 21, wherein the light scatterer is a nonconventional optical element.

28. The three-dimensional image projection system of example 27, wherein the nonconventional optical element comprises a volume hologram.

29. A system for projecting an object wave field into a projection volume, comprising:
   a wave diffuser;
   a wave field projector configured to project a wave field onto the wave diffuser; and,
   a controller coupled to the wave field projector, wherein the controller is configured to cause the wave field projector to project a wave field that, upon interacting with the wave diffuser, is redirected to form an object wave field that forms a predetermined complex functional pattern in the projection volume.

30. The system of example 29, wherein:
   the wave field projector comprises a light field projector,
   the wave diffusive medium comprises a light diffuser, and
   the object wave field comprises an object light field.

31. The system of example 30, wherein the predetermined complex functional pattern comprises an image in the projection volume.

32. A computer monitor comprising the system of example 30.

33. A three-dimensional image projector comprising the system of example 30, wherein the object light field forms a three-dimensional image.

34. A photolithography system comprising the system of example 30, wherein the object light field is configured to form a predetermined image in a photosensitive medium conforming to a surface in the projection volume.

35. A camouflage system comprising the system of example 30.

36. A heads-up display comprising the system of example 30.

37. The heads-up display of example 36, wherein the light diffuser comprises a volume hologram configured to diffuse light of a plurality of predetermined wavelengths, and
   wherein the light field projector is configured to project a light field comprising the predetermined wavelengths.

38. The system of example 29, wherein:
   the wave field projector comprises an acoustic field projector;
   the wave diffuser comprises an acoustic diffuser; and
   the object wave field comprises an object acoustic field.

39. An acoustic surgical system comprising the system of example 38.

40. A near-eye display, comprising:
   a holographic element configured to be positioned in front of a wearer's eye;
   a light field projector configured to project a first light field onto the holographic element via an optical coupler; and
   a controller coupled to the light field projector, wherein the controller is configured to determine the first light field and to cause the light field projector to project the first light field,
      such that the holographic element redirects the first light field to form a second light field directed into the wearer's eye, and
      such that the second light field is perceptible by the wearer as a virtual image at a distance from the eye and the holographic element.

41. The near-eye display of example 40, wherein the holographic element is embedded within a flat or curved slab of translucent material.

42. The near-eye display of example 40, wherein the holographic element is configured to diffuse light of a predetermined color and transmit light of other colors without substantial scattering.

43. The near-eye display of example 40, wherein the second light field further forms a three-dimensional image.

44. An eyewear assembly comprising the near-eye display of example 40, the eyewear system comprising:
   a frame configured to be worn on the head of the wearer, the frame including first and second rims with lenses affixed therein, and first and second temple arms extending away from the first and second rims.

45. The eyewear assembly of example 44, wherein the holographic element is positionable over one of the first and second lenses.

46. The eyewear assembly of example 44, wherein the holographic element is integrated into one of the first and second lenses.

47. The eyewear assembly of example 44, wherein the light field projector and the controller are coupled to the frame.

48. The eyewear assembly of example 47, wherein the light field projector and the controller are integrated into one of the first and second temple arms.

49. The eyewear assembly of example 44, further comprising a second near-eye display.

50. A method of projecting an image with a light field projector through a diffuser and into a projection volume, the method comprising:
   determining light fields corresponding to multiple points in the projection volume;
   providing the image to be displayed in the projection volume as a sum of points to be illuminated in the projection volume;
   determining the light field corresponding to each of the points to be illuminated in the projection volume;
   calculating the linear superposition of each of the determined light fields; and
   projecting a light field onto the diffuser that corresponds to the calculated linear superposition, thereby forming the image in the projection volume.

51. The method of example 50, wherein determining the light fields corresponding to the multiple points in the projection volume comprises calibrating the light field projector.

52. The method of example 51, wherein calibrating the light field projector comprises:
   disposing a point light source in the projection volume;
   disposing a photosensor in a position to receive light from the point light source that first passes through the diffuser;
   illuminating the photosensor with a reference beam that is temporally coherent with the point light source.

53. The method of example 52, wherein a beam splitter redirects at least a portion of the light from the point light source towards the photosensor after passing through the diffuser.

54. The method of example 51, wherein the photosensor comprises a photosensor array.

55. The method of example 51, wherein calibrating the light field projector comprises:
   disposing a retroreflector in the projection volume;
   disposing a photosensor in a position to receive light retroreflected from the retroreflector that passes through the diffuser; and
   illuminating the retroreflector with light from the light field projector.

56. The method of example 55, wherein a beam splitter redirects at least a portion of the retroreflected light towards the photosensor after passing through the diffuser.

57. A system for projecting an object wave field in a projection volume with a wave field projector and a diffuser, the system comprising:
   means for determining multiple input wave fields which, when projected onto the diffuser by the wave field projector, are redirected to form corresponding component wave fields in the projection volume,
      wherein the component wave fields comprise a set of wave fields by which the object wave field in the projection volume can be formed as a linear superposition;
   means for specifying an object wave field to project into the projection volume;
   means for determining coefficients of a linear decomposition of the object wave field into component fields;
   means for calculating a linear superposition of the input wave fields corresponding to the component fields; and
   means for projecting a wave field corresponding to the linear superposition of the input wave fields onto the diffuser.

58. The system of example 57, wherein the wave field projector comprises a light field projector and the wave fields comprise light fields.

59. The system of example 57, wherein the coefficients of the linear superposition are proportional to the coefficients of the linear decomposition of the specified object wave field.

I claim:

1. A system for projecting an object wave field into a projection volume, comprising:
   a wave scatterer that at least quasi-randomly redirects local portions of incident wave fronts;
   a wave field projector configured to project a range of pre-distorted wave fields onto the wave scatterer; and,
   a controller coupled to the wave field projector, wherein the controller is configured to cause the wave field projector to project the pre-distorted wave fields so that, upon interacting with the wave scatterer, each of the pre-distorted wave fields is reshaped to form an object wave field that forms a predetermined pattern in the projection volume.

2. The system of claim 1, wherein:
   the wave field projector comprises a light field projector,
   the wave scatterer comprises a light scatterer, and
   the object wave field comprises an object light field.

3. A three-dimensional image projector comprising the system of claim 2, wherein the object light field forms a three-dimensional image.

4. A camouflage system comprising the system of claim 2.

5. A heads-up display comprising the system of claim 2.

6. The heads-up display of claim 5, wherein the light scatterer comprises a volume hologram configured to scatter light of a plurality of predetermined wavelengths, and
   wherein the light field projector is configured to project a light field comprising the predetermined wavelengths.

7. An acoustic surgical system comprising the system of claim 1, wherein:
   the wave field projector comprises an acoustic field projector;
   the wave scatterer comprises an acoustic diffuser; and
   the object wave field comprises an object acoustic field.

8. A near-eye display, comprising:
   a waveguide;
   a holographic element comprising a plurality of holographic components in different positions along the waveguide;
   a light field projector configured to project a first light field into the waveguide via an optical coupler for propagation to the holographic components; and
   a controller coupled to the light field projector, wherein the controller is configured to determine the first light field and to cause the light field projector to project the first light field into the waveguide as a plurality of propagating modes,
   wherein each of the holographic components redirects a different one of the propagating modes of redirects the first light field from the different positions along the waveguide to form a second light field directed into an eyebox, and
   wherein the second light field is perceptible within the eyebox by a viewer's eye as a virtual image at a distance from the eye and the holographic element.

9. The near-eye display of claim 8, wherein the waveguide is a flat or curved slab of translucent material.

10. The near-eye display of claim 8, wherein the holographic element is configured to redirect light of a predetermined color and transmit light of other colors without substantial redirection.

11. The near-eye display of claim 8, wherein the second light field further forms a three-dimensional image.

12. An eyewear assembly comprising the near-eye display of claim 8, the eyewear system assembly further comprising:
a frame configured to be worn on the head of the viewer, the frame including first and second rims with lenses affixed therein, and first and second temple arms extending away from the first and second rims.

13. The eyewear assembly of claim 12, wherein the waveguide and the holographic element is integrated into at least one of the first and second lenses.

14. The eyewear assembly of claim 12, wherein the light field projector and the controller are integrated into one of the first and second temple arms.

15. The eyewear assembly of claim 12, further comprising a second near-eye display.

16. The system of claim 1, wherein the predetermined pattern comprises a plurality of voxels and each of the projected pre-distorted wave fields is a linear superposition of individual wave fields required to form the respective voxels upon interacting with the wave scatterer.

17. The system of claim 2 in which the predetermined pattern is an image comprising a plurality of voxels within the projection volume, and each of the pre-distorted wave fields projected by the light field projector comprises a plurality of sub-frame light fields that are sequentially projected for illuminating different sets of voxels within the projection volume.

18. The system of claim 2 in which the predetermined pattern encodes a virtual image that is viewable within an eyebox, and each of the pre-distorted wave fields is reshaped by the light scatterer to form the virtual image that is viewable within the eyebox.

* * * * *